United States Patent
Robinson et al.

(10) Patent No.: US 9,173,011 B2
(45) Date of Patent: Oct. 27, 2015

(54) SATELLITE-BASED LOW POWER RESOURCE METER READING SYSTEMS AND METHODS

(75) Inventors: Les Robinson, Watertown, SD (US); Rod Redlin, Watertown, SD (US); Angelo A. Polsinelli, Watertown, SD (US); Keith W. Carlson, Watertown, SD (US); Stephen A. Uban, Pillager, MN (US)

(73) Assignee: Informational Data Technologies, LLC, Watertown, SD (US)

( * ) Notice: Subject to any disclaimer, the term of this patent is extended or adjusted under 35 U.S.C. 154(b) by 706 days.

(21) Appl. No.: 13/340,380

(22) Filed: Dec. 29, 2011

(65) Prior Publication Data
US 2012/0197552 A1  Aug. 2, 2012

Related U.S. Application Data

(60) Provisional application No. 61/460,257, filed on Dec. 29, 2010.

(51) Int. Cl.
*G01D 4/00* (2006.01)
*H04Q 9/00* (2006.01)

(52) U.S. Cl.
CPC .............. *H04Q 9/00* (2013.01); *G01D 4/002* (2013.01); *H04Q 2209/60* (2013.01); *Y02B 90/241* (2013.01); *Y02B 90/246* (2013.01); *Y04S 20/32* (2013.01); *Y04S 20/42* (2013.01)

(58) Field of Classification Search
CPC ............................. G01D 4/002; H04Q 2209/60
See application file for complete search history.

(56) References Cited

U.S. PATENT DOCUMENTS 3,270,559 A  9/1966  Gleasman et al.
4,315,251 A  2/1982  Robinson et al.
(Continued)

FOREIGN PATENT DOCUMENTS

EP  2290390 A1 * 3/2011
JP  63067033 A  * 3/1988
(Continued)

OTHER PUBLICATIONS

Duffy, Daniel P., Water Meters and Auomatic Meter Reading, http://waterefficiency.net/WE/Articles/639.aspx, (Oct. 31, 2006).*
(Continued)

*Primary Examiner* — Timothy H Hwang
(74) *Attorney, Agent, or Firm* — Merchant & Gould P.C.

(57) ABSTRACT

Systems and methods for monitoring a utility resource are disclosed. One system includes utility resource usage capture components connected to a utility resource management computing system via a satellite communications network. Each of the utility resource usage capture components includes a utility resource meter interface and a satellite communication module. The utility resource meter interface is configured to communicate with different types of utility resource meters from different manufacturers. Each of the utility resource usage capture components has a low power state and an operational state, and is configured to automatically enter the operational state, interrogate an associated utility resource meter, communicate the reading via the satellite communication module, and return to the low power state. The utility resource management computing system stores information regarding a location of each of the utility resource usage capture components and receives and stores readings from each of the utility resource usage capture components.

23 Claims, 38 Drawing Sheets

(56) References Cited

U.S. PATENT DOCUMENTS

| | | |
|---|---|---|
| 4,396,915 A | 8/1983 | Farnsworth et al. |
| 4,939,931 A * | 7/1990 | Reeves .................. 73/201 |
| 5,594,431 A | 1/1997 | Sheppard et al. |
| 6,073,169 A | 6/2000 | Shuey et al. |
| 6,710,721 B1 | 3/2004 | Holowick |
| 6,801,865 B2 | 10/2004 | Gilgenbach et al. |
| 7,099,781 B1 * | 8/2006 | Heidl et al. ............. 702/45 |
| 7,231,482 B2 | 6/2007 | Leach |
| 7,310,052 B2 | 12/2007 | Bowman |
| 7,671,480 B2 | 3/2010 | Pitchford et al. |
| 7,688,220 B2 | 3/2010 | Bovankovich et al. |
| 7,768,424 B2 | 8/2010 | Harvey et al. |
| 7,847,707 B2 | 12/2010 | Bakken et al. |
| 7,956,767 B2 | 6/2011 | Ratiu et al. |
| 8,063,792 B2 | 11/2011 | Sala et al. |
| 2004/0259523 A1 | 12/2004 | Stenger |
| 2005/0030015 A1 | 2/2005 | Duncan et al. |
| 2006/0028355 A1 | 2/2006 | Patterson et al. |
| 2007/0008171 A1 | 1/2007 | Bowman |
| 2007/0139219 A1 * | 6/2007 | Crider et al. ........... 340/870.02 |
| 2007/0171092 A1 | 7/2007 | Allgood |
| 2008/0144548 A1 | 6/2008 | Shuey et al. |
| 2008/0218164 A1 | 9/2008 | Sanderford |
| 2009/0058676 A1 | 3/2009 | Orlosky |
| 2009/0102681 A1 | 4/2009 | Brennan, Jr. et al. |
| 2009/0172801 A1 * | 7/2009 | Friedrich et al. ............ 726/12 |
| 2009/0207042 A1 | 8/2009 | Park et al. |
| 2009/0309755 A1 | 12/2009 | Williamson et al. |
| 2010/0219982 A1 | 9/2010 | Villessot et al. |
| 2010/0289652 A1 | 11/2010 | Javey et al. |
| 2011/0066297 A1 | 3/2011 | Saberi et al. |
| 2011/0068947 A1 * | 3/2011 | Holman et al. ........ 340/870.02 |

FOREIGN PATENT DOCUMENTS

| | | |
|---|---|---|
| WO | WO 00/33049 | 6/2000 |
| WO | WO 2004/044862 A1 | 5/2004 |
| WO | WO 2004044862 A1 * | 5/2004 |
| WO | WO 97/33397 | 9/2007 |

OTHER PUBLICATIONS

Broersma, Matthew, Hitachi aims for 10-year lithium-ion battery life, http://www.zdnet.com/article/hitachi-aims-for-10-year-lithium-ion-battery-life/, Apr. 7, 2010.*

International Search Report and Written Opinion mailed Apr. 17, 2012

Neptune Technology Group, R900® Gateway V2 Data Collector (Product Sheet), Copyright 2011, 2 Pages.

Neptune Technology Group, R900G Endpoint (Product Sheet), Copyright 2007, 2 Pages.

Neptune Technology Group, AMR PERMALOG® (Product Sheet), Copyright 2011, 2 Pages.

Neptune Technology Group, R900® Wall or Pit Miu (Product Sheet), Copyright 2011, 2 Pages.

Neptune Technology Group, E-CODER/R900i™—Inside and Pit Versions (Product Sheet), Copyright 2010, 2 Pages.

* cited by examiner

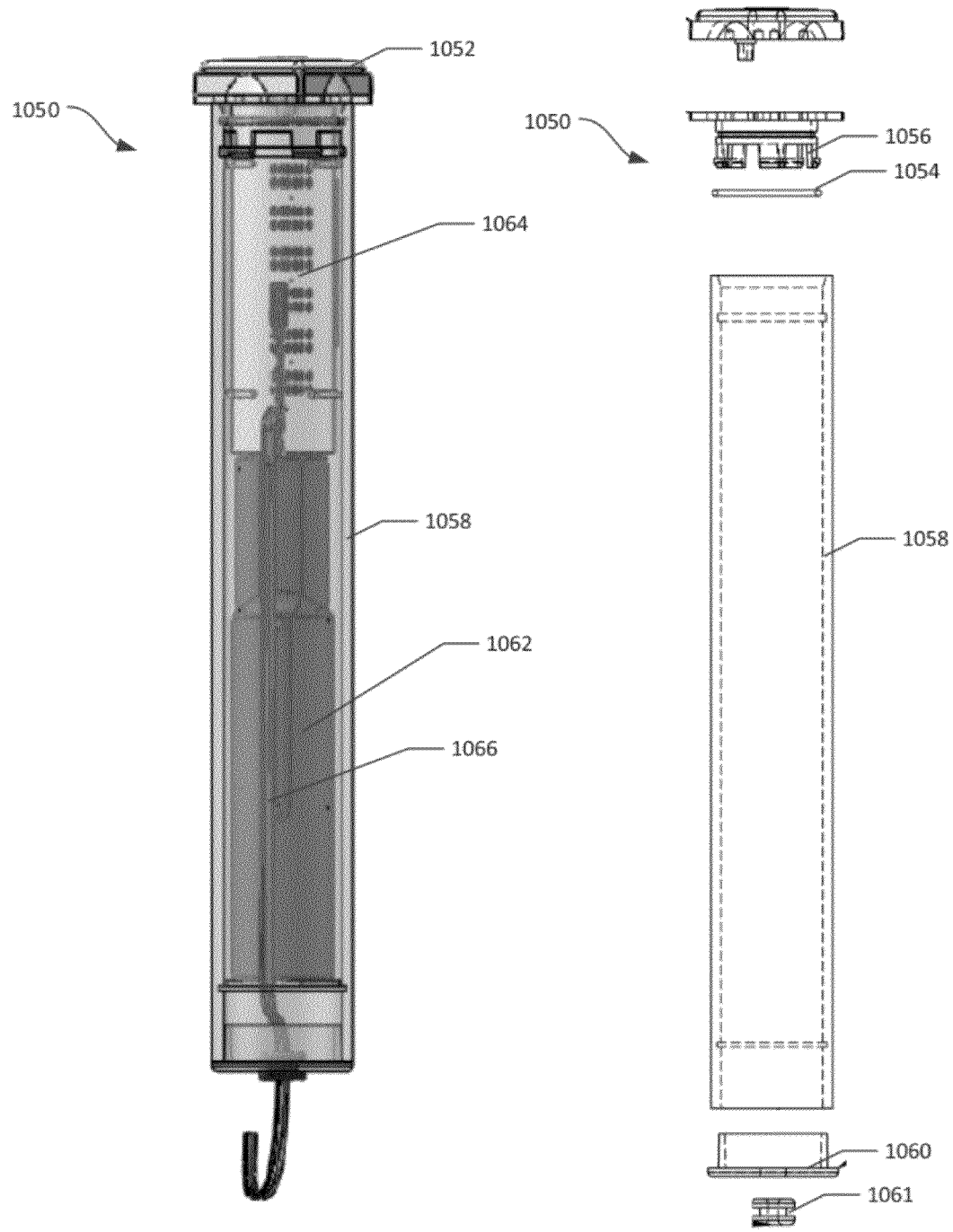

Water Utility Creation

| System Setup | User Maint. | Site install | Site add | New site | Dashboard | Alarm Handling | Customer service | Site detail | Trouble shooting | Customer usage Reports | Billing | Data Export |
|---|---|---|---|---|---|---|---|---|---|---|---|---|
| Data Import | | | | | | | | | | | | |

System Search

[ New ]  [ Edit ]  [ Cancel ]  [ Save ]

Name — ORG01 — End of month billing day — ORG11
Address1 — ORG02 — Default high usage alert % - Normal — ORG012
Address2 — ORG03 — Default high usage alert % - Commercial — ORG013
City — ORG04 — Default high usage alert % - Zone — ORG014
State or Region — ORG05 — Days of rolling average — ORG015
Country — ORG06 — Logo file [Browse for file] — ORG016
Zip code / Postal Code — ORG07 — Frequency of password change — ORG017
Phone Number — ORG08 — Tax Exempt Y/N — ORG018
Fax Number — ORG09 — Application ID — ORG019
Time Zone — ORG10 — Organization ID — ORG020

Unit Activation Status

| Unit Activation | Unit Status | Site Selection | Install Sheet | Site Completion | Print Screen | Help |

Requested Unit Activation

| Date | ISN # |
|---|---|
| xx/xx/xx | MOD01-1 |
| xx/xx/xx | MOD01-2 |
| xx/xx/xx | MOD01-3 |
| xx/xx/xx | MOD01-4 |
| xx/xx/xx | MOD01-5 |
| xx/xx/xx | MOD01-6 |
| xx/xx/xx | MOD01-7 |
| xx/xx/xx | MOD01-8 |
| xx/xx/xx | MOD01-9 |
| xx/xx/xx | MOD01-10 |

Units Activated but not Installed

| Date | ISN # |
|---|---|
| xx/xx/xx | MOD01-11 |
| xx/xx/xx | MOD01-12 |
| xx/xx/xx | MOD01-13 |
| xx/xx/xx | MOD01-14 |
| xx/xx/xx | MOD01-15 |
| xx/xx/xx | MOD01-16 |
| xx/xx/xx | MOD01-17 |
| xx/xx/xx | MOD01-18 |
| xx/xx/xx | MOD01-19 |
| xx/xx/xx | MOD01-20 |

Site Selection

| Unit Activation | Unit Status | Site Selection | Install Sheet | Site Completion | Print Screen | Help |
|---|---|---|---|---|---|---|

| Select | Last Name | First Name | Address | City | Zone | Account # | Location ID |
|---|---|---|---|---|---|---|---|
| ☐ | CUS04-1 | CUS03-1 | LOC02-1 & LOC03-1 | LOC04-1 | MET09-1 | CUS01-1 | LOC01-1 |
| ☐ | CUS04-2 | CUS03-2 | LOC02-2 & LOC03-2 | LOC04-2 | MET09-2 | CUS01-2 | LOC01-2 |
| ☐ | CUS04-3 | CUS03-3 | LOC02-3 & LOC03-3 | LOC04-3 | MET09-3 | CUS01-3 | LOC01-3 |
| ☐ | CUS04-4 | CUS03-4 | LOC02-4 & LOC03-4 | LOC04-4 | MET09-4 | CUS01-4 | LOC01-4 |
| ☐ | CUS04-5 | CUS03-5 | LOC02-5 & LOC03-5 | LOC04-5 | MET09-5 | CUS01-5 | LOC01-5 |
| ☐ | CUS04-6 | CUS03-6 | LOC02-6 & LOC03-6 | LOC04-6 | MET09-6 | CUS01-6 | LOC01-6 |
| ☐ | CUS04-7 | CUS03-7 | LOC02-7 & LOC03-7 | LOC04-7 | MET09-7 | CUS01-7 | LOC01-7 |
| ☐ | CUS04-8 | CUS03-8 | LOC02-8 & LOC03-8 | LOC04-8 | MET09-8 | CUS01-8 | LOC01-8 |
| ☐ | CUS04-9 | CUS03-9 | LOC02-9 & LOC03-9 | LOC04-9 | MET09-9 | CUS01-9 | LOC01-9 |

| Search | Window to enter search phrase | Cancel | Create Install Sheets |
|---|---|---|---|

Install Sheet

| Remove | Location ID | Last Name, First Name | Address | City | Last Meter Read | Account# |
|---|---|---|---|---|---|---|
| ☐ | LOC01-1 | CUS04-1, CUS03-1 | LOC02-1 & LOC03-1 | LOC04-1 | MET03-1 | CUS01-1 |
| ☐ | LOC01-2 | CUS04-2, CUS03-2 | LOC02-2 & LOC03-2 | LOC04-2 | MET03-2 | CUS01-2 |
| ☐ | LOC01-3 | CUS04-3, CUS03-3 | LOC02-3 & LOC03-3 | LOC04-3 | MET03-3 | CUS01-3 |
| ☐ | LOC01-4 | CUS04-4, CUS03-4 | LOC02-4 & LOC03-4 | LOC04-4 | MET03-4 | CUS01-4 |
| ☐ | LOC01-5 | CUS04-5, CUS03-5 | LOC02-5 & LOC03-5 | LOC04-5 | MET03-5 | CUS01-5 |
| ☐ | LOC01-6 | CUS04-6, CUS03-6 | LOC02-6 & LOC03-6 | LOC04-6 | MET03-6 | CUS01-6 |
| ☐ | LOC01-7 | CUS04-7, CUS03-7 | LOC02-7 & LOC03-7 | LOC04-7 | MET03-7 | CUS01-7 |
| ☐ | LOC01-8 | CUS04-8, CUS03-8 | LOC02-8 & LOC03-8 | LOC04-8 | MET03-8 | CUS01-8 |
| ☐ | LOC01-9 | CUS04-9, CUS03-9 | LOC02-9 & LOC03-9 | LOC04-9 | MET03-9 | CUS01-9 |

Tabs: Unit Activation | Unit Status | Site Selection | Install Sheet | Site Completion | Print Screen | Help Cancel | Print Install Sheets — 2302

Site Completion 1

| Unit Activation | Unit Status | Site Selection | Install Sheet | Site Completion | Print Screen | Help |

Location ID: [ LOC01 ] Scan barcode from installation sheet

Unit ID:
(SN #) [ MOD01 ] Scan barcode from installation sheet

Location ID's
completed this session:
LOC01-1
LOC01-2
LOC01-3
. . . . . . . . . . . .
LOC01-N

[ Cancel ]  [ Next Step ]

Figure 31:
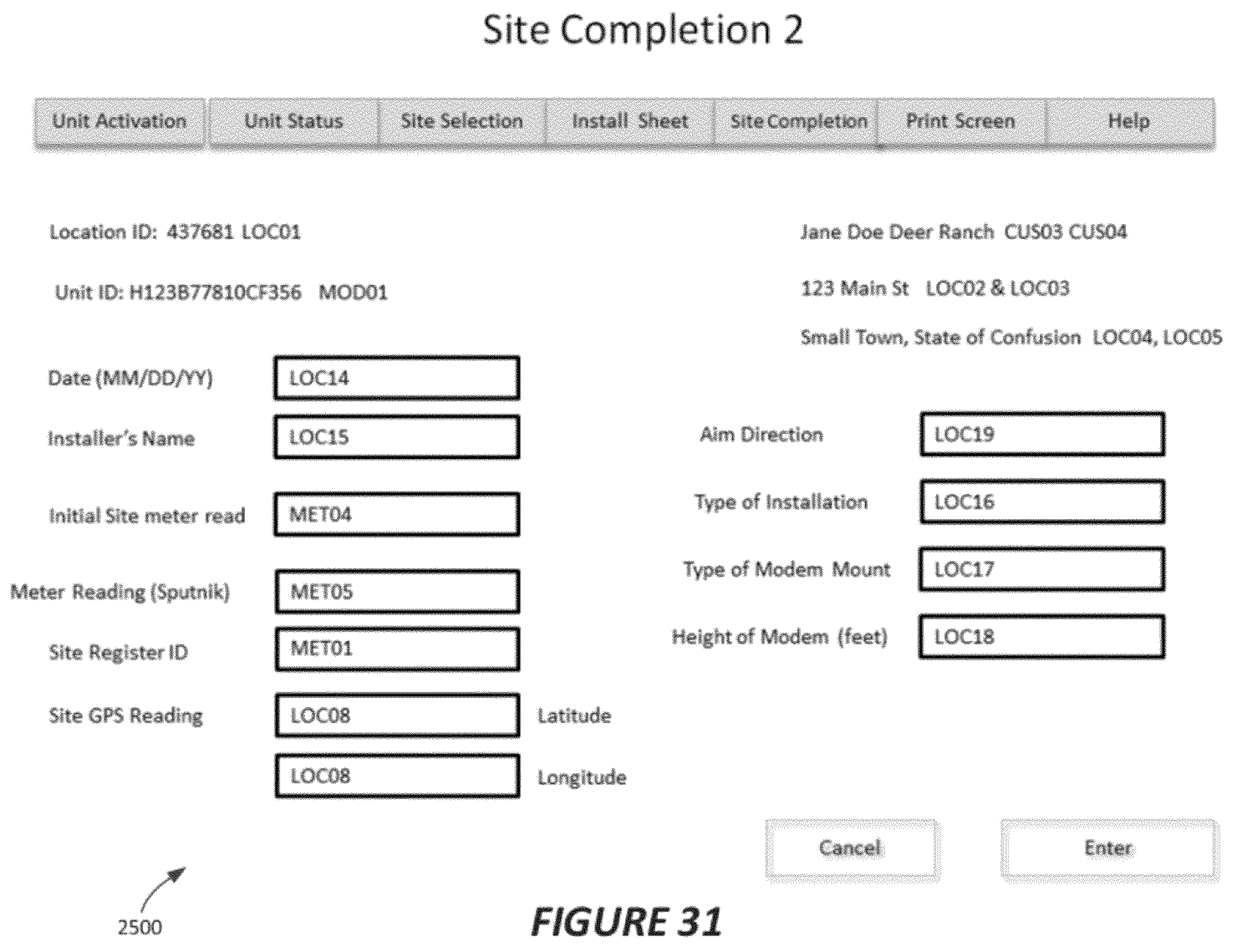

Site Completion 2

| Unit Activation | Unit Status | Site Selection | Install Sheet | Site Completion | Print Screen | Help |

Location ID: 437681 LOC01

Unit ID: H123B77810CF356 MOD01

Jane Doe Deer Ranch CUS03 CUS04

123 Main St LOC02 & LOC03

Small Town, State of Confusion LOC04, LOC05

Date (MM/DD/YY) [LOC14]

Installer's Name [LOC15]

Initial Site meter read [MET04]

Meter Reading (Sputnik) [MET05]

Site Register ID [MET01]

Site GPS Reading [LOC08] Latitude
[LOC08] Longitude

Aim Direction [LOC19]

Type of Installation [LOC16]

Type of Modem Mount [LOC17]

Height of Modem (feet) [LOC18]

[Cancel]  [Enter]

Site Add/Modify

System Name ORG01

Tabs: System Setup | User Maint. | Site Install | add/Edit | site tracking | System Dashbd | Alarm | Cust. service | Site detail | Troubleshooting | Customer usage | Reports | Billing | Data Export Select System | New | Search | Edit | Save | Cancel Data Import Left column fields:
- Address1 — LOC02
- Address2 — LOC03
- City — LOC04
- State or Region — LOC05
- ZIP or Postal code — LOC06
- Initial GPS Location — LOC07A LAT / LOC07B LOG
- Location Type — LOC10
- Alert Threshold % — LOC09
- Days of rolling average — LOC11
- Latest Meter Read — MET04
- Meter model # — MET06
- Remote reader model # — MET07
- Billable — MET08
- Zone iD — MET09

Right column fields:
- Account number — CUS01
- First Name — CUS02
- Last Name — CUS03
- Billing Address 1 — CUS04
- Billing Address 2 — CUS05
- Billing City — CUS06
- Billing State/ Region — CUS07
- Billing Zip/ Postal code — CUS08
- Email — CUS09
- Phone — CUS10
- Parent meter (zone) — MET12
- Units (100's or 1000's) — MET11

Site Detail

| System Setup | User Maint. | Site install | Add/edit | Site tracking | System Dashboard | Alarm Handling | Customer service | Site detail | Troubleshooting | Customer usage Reports | Billing |
|---|---|---|---|---|---|---|---|---|---|---|---|
| | Data Import | | | | | | | | | | Data Export |

[ Idt View ]    [ Change Date Range ]                    [ Customer View ]

Account Number CUS01    Name CUS02 CUS03    Address LOC02 LOC03 LOC04 LOC05    Reporting Time MOD04

ISN # MOD01    Terminal ID MOD02    Location Status LOC12    Meter Model # MET06    Remote Reader Model MET07

DMR Version MOD05    MCU Version MOD06    Type of Installation LOC16    Modem Mount LOC17

Script Version MOD08    Firmware Version MOD07    Aim Direction LOC19    Modem Height LOC18

[ Link to install sheet ]    GPS Location LOC08 A & B

| Date & time | Meter Reading | Error Codes | Flow Alerts | Battery Voltage | Register ID | Slot time | SNR | Satellite (region) | Temp. | Number of BB acquires |
|---|---|---|---|---|---|---|---|---|---|---|
| DAY08 & DAY09 | DAY03 | DAY04 | LOC22 | DAY02 | DAY05 | DAY07 | | DAY06 | | |
| FST15 & FST16 | FST03 | FST04 | LOC22 | FST02 | FST05 | FST06 | FST07 | FST08 | FST12 | FST11 |

SATELLITE-BASED LOW POWER RESOURCE METER READING SYSTEMS AND METHODS

CROSS-REFERENCE TO RELATED APPLICATIONS

The present application claims priority from U.S. Provisional Patent Application No. 61/460,257, filed Dec. 29, 2010, the disclosure of which is hereby incorporated by reference in its entirety.

TECHNICAL FIELD

The present application relates generally to utility resource meter reading and communications. In particular, the present application relates generally to systems and methods for satellite-based low power resource meter reading.

BACKGROUND

Resource meters, in particular utility resource meters, are configured to monitor usage of a particular resource over time. For example, various utilities, such as electrical utilities, water utilities, gas utilities, or other utility providers wish to monitor usage of the resource that they provide, and bill customers of that utility according to usage. Resource meters are therefore placed at each billed location to determine usage at that location to ensure that resource usage is accurately captured.

To facilitate accurate reading of such resource meters, a variety of schemes have been developed. Some systems, in particular for electricity usage meters, where power and data communications capabilities are typically available, the meter itself can be configured to communicate data to a centralized data collection location. Alternatively, in cases where a meter may be powered but may lack a data connection, the meter may be outfitted with a radio frequency transceiver. In such cases, a utility will send a mobile interrogation system (typically, a vehicle travelling through neighborhoods in which the utility provides the resource) through the neighborhood, and that mobile interrogation system will obtain a reading wirelessly from the meter or communication device associated with the reader, thereby eliminating the need for each reader to be personally viewed and recorded by an employee of the utility. These systems typically include "smart meter" systems, that provide realtime or near-realtime monitoring of resource usage.

Although the above metering systems provide improved meter reading efficiency, there are circumstances in which such systems do not work well. In particular, where no localized communication system and no power source are available at the meter location, radio frequency interrogation and wireline data communication are not possible. This may be due to a remote location of the meter, or generally wide geographic dispersement of meters, such that existing interrogation systems are impracticable. For example, in the case of water metering, it is common in rural areas for water meters to be located on property far from roads, electrical lines, or data connections. In such circumstances, it is impossible to provide wireline communication, and either cellular communication or RF, "drive-by" approaches are not feasible as well, due to the unavailability of a data signal, or simply due to an issue of driving past every meter being cost prohibitive.

In these circumstances, a variety of simpler, manual approaches have been considered. Currently, it is common for ranchers, farmers, or other geographically remote water users to self-report water usage on a monthly basis. A water utility may provide a coupon book including discounted water usage in exchange for accurate, monthly water meter readings from each utility customer. The customer is then responsible for viewing each meter associated with him/her, and entering those readings either on paper or into a web interface. Additionally, it requires the customer to manually read each meter on that customer's property each month. This solution therefore suffers from many problems including under- and over-reporting of water usage, unresponsiveness on the part of the utility customer, or other issues. Furthermore, it can be difficult to determine when a particular water main or other resource conduit has been compromised, since usage cannot be reliably monitored. Therefore, in particular for utility districts that distribute utility resources to remote areas where power, communication, or otherwise reading of a meter may be impractical, there remain a number of shortcomings in existing systems.

For these and other reasons, improvements are desirable.

SUMMARY

In accordance with the following disclosure, the above and other issues are addressed by the following:

In a first aspect, a system for monitoring a utility resource is disclosed. The system includes a plurality of utility resource usage capture components connected to a utility resource management computing system via a satellite communications network. Each of the utility resource usage capture components includes a utility resource meter interface and a satellite communication module. The utility resource meter interface is configured to communicate with a plurality of different types of utility resource meters from a plurality of different manufacturers. Each of the plurality of utility resource usage capture components has a low power state and an operational state and configured to automatically enter the operational state, interrogate an associated utility resource meter to obtain a reading and communicate the reading via the satellite communication module, and return to the low power state. The utility resource management computing system stores information regarding a location of each of the utility resource usage capture components and is configured to receive and store readings from each of the plurality of utility resource usage capture components.

In a second aspect, a method of monitoring usage of a utility resource is disclosed. The method includes associating a plurality of utility resource usage capture components with a plurality of utility resource meters within a utility network, the plurality of utility resource meters including utility resource meters made by a plurality of different manufacturers, each of the plurality of utility resource usage capture components having a low power state and an operational state. The method also includes capturing an identity of each utility resource usage capture component and associating the identity with a location of the utility resource meter, a resource user, and a utility. The method further includes automatically receiving, via a satellite communication link, periodic updates from each of the plurality of utility resource meters at the associated plurality of utility resource usage capture components.

In a third aspect, a water monitoring system includes a plurality of water usage capture components communicatively connected to a water management computing system via a message relay device of a satellite communications network. The water usage capture components are positioned at known locations, and are each communicatively connected to a different installed water meter across a water district.

Each water usage capture component lacks a connection to an external power source, and water flow passing each water meter and associated water usage capture component is unobstructed. Each water usage capture components includes a water meter interface configured to communicate with a plurality of different types of water meters from a plurality of different manufacturers, each of the plurality of water usage capture components having a low power state and an operational state and configured to automatically enter the operational state, interrogate an associated water meter to obtain a reading, and return to the low power state. Each water usage capture component further includes a satellite communication module configured to communicate the reading to a remote system. The water management computing system includes a water management database storing information regarding a location of each of the plurality of water usage capture components and configured to receive and store readings from each of the plurality of water usage capture components.

BRIEF DESCRIPTION OF THE DRAWINGS

FIG. 11 is a side perspective view of a second example embodiment of a water meter reading device;

FIG. 12 is an exploded side perspective view of the water meter reading device of FIG. 11;

FIG. 24 is an example schematic user interface of a web application for a utility management application for creating a new customer water utility in the application, according to an example embodiment;

FIG. 25 is an example schematic user interface of a web application for a utility management application for maintaining users within the application, according to an example embodiment;

FIG. 26 is an example schematic user interface of a web application for a utility management application for activating one or more utility resource usage capture components, according to an example embodiment;

FIG. 27 is an example schematic user interface of a web application for a utility management application for displaying activation status of one or more utility resource usage capture components, according to an example embodiment;

FIG. 28 is an example schematic user interface of a web application for a utility management application for selecting one or more locations to be associated with a particular utility resource usage capture component, according to an example embodiment;

FIG. 29 is an example schematic user interface of a web application for a utility management application for generating installation sheets for use by an installer to complete installation of one or more utility resource usage capture components, according to an example embodiment;

FIG. 30 is an example schematic user interface of a web application for a utility management application for web-entry of installation details regarding one or more utility resource usage capture components, according to an example embodiment;

FIG. 31 is a second example schematic user interface of a web application for a utility management application for web-entry of installation details regarding one or more utility resource usage capture components, according to an example embodiment;

FIG. 32 is an example schematic user interface of a web application for a utility management application for validating an installation of a utility resource usage capture component at a particular site or location, according to an example embodiment;

FIG. 33 is an example schematic user interface of a web application for a utility management application for modifying details regarding a location of one or more utility resource usage capture components associated with a particular billed resource user, according to an example embodiment;

FIG. 34 is an example schematic user interface of a web application for a utility management application for modifying details regarding a particular billed customer location, according to an example embodiment;

DETAILED DESCRIPTION

Figure 1:
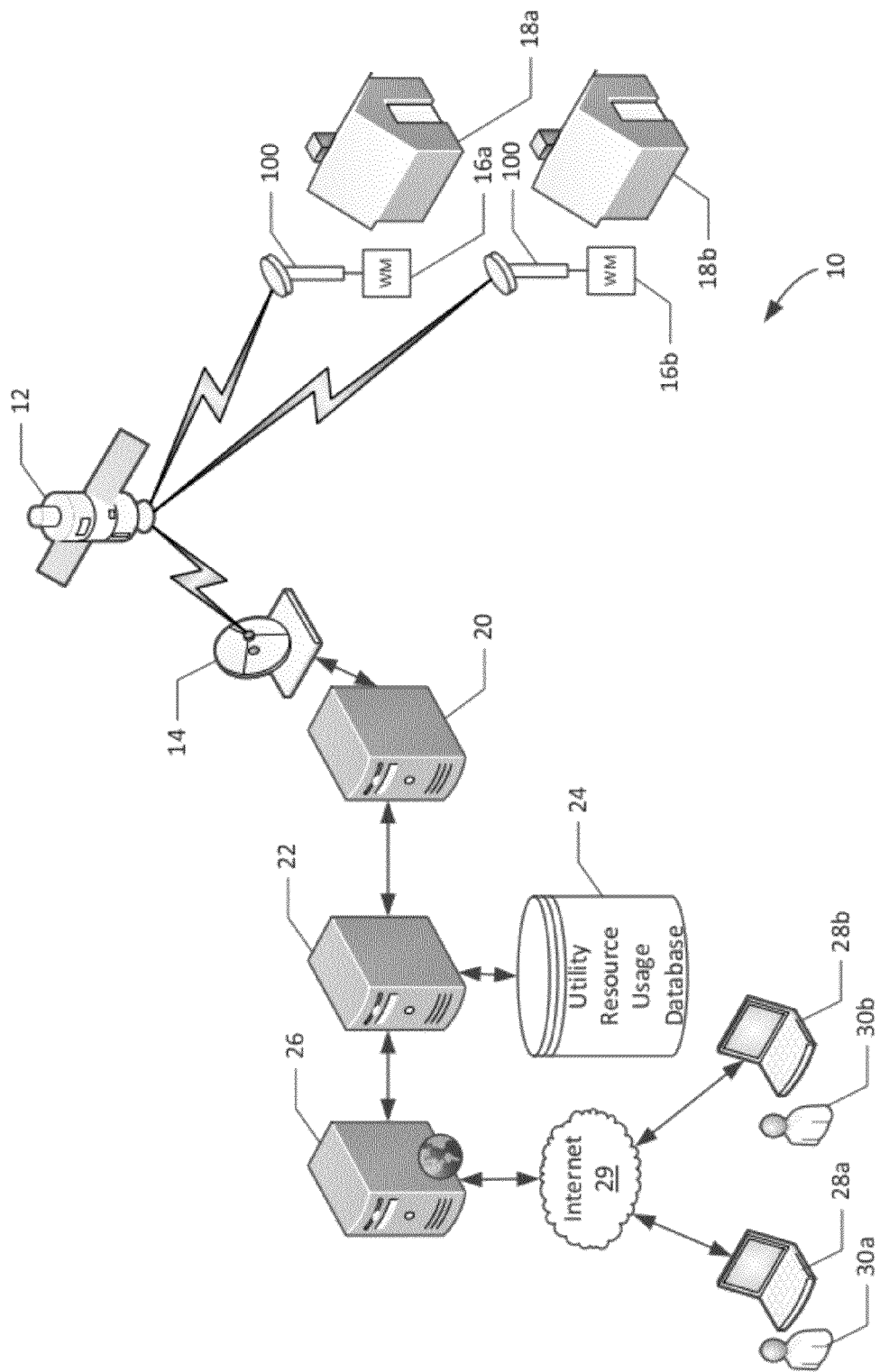
FIG. 1 is a schematic view of a satellite-based low power resource meter reading system, according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of some of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler. As such, the various methods disclosed herein could be embodied within systems, and systems disclosed herein may be used to perform the methods disclosed.

In general the present disclosure relates to systems and methods for satellite-based low power resource meter reading. The systems and methods described herein include, in some embodiments, a utility resource usage capture component that can be interfaced to a utility resource usage meter. The component can communicate with a variety of different types of meters, and is configured for low-power, long life operation. In such embodiments, the component can include a low power state and an operational state. When operational, the component can obtain a reading from a utility resource usage meter and communicate that reading to a remote system for aggregation and analysis.

As will be apparent from the embodiments discussed herein, the methods and systems disclosed provide a number of advantages over existing meter reading components. For example, the components discussed in the context of the present disclosure are by default only active for a small portion of the day (typically about 30 seconds), thereby ensuring very little power usage. Additionally, through use of satellite communication, the components of the systems described herein can be installed as stand-alone devices (i.e., without supporting data or power requirements) in remote locations. Furthermore, the components discussed herein generally are developed to accommodate meters from a plurality of different manufacturers, and while formatting data for access and analysis by users within a particular water district, by the water district itself, or by system administrators accessing more than one such water district, for example for comparative and deductive analysis of water usage.

A. Overall Systems and Methods for Satellite-Based Resource Meter Reading

Figure 2:
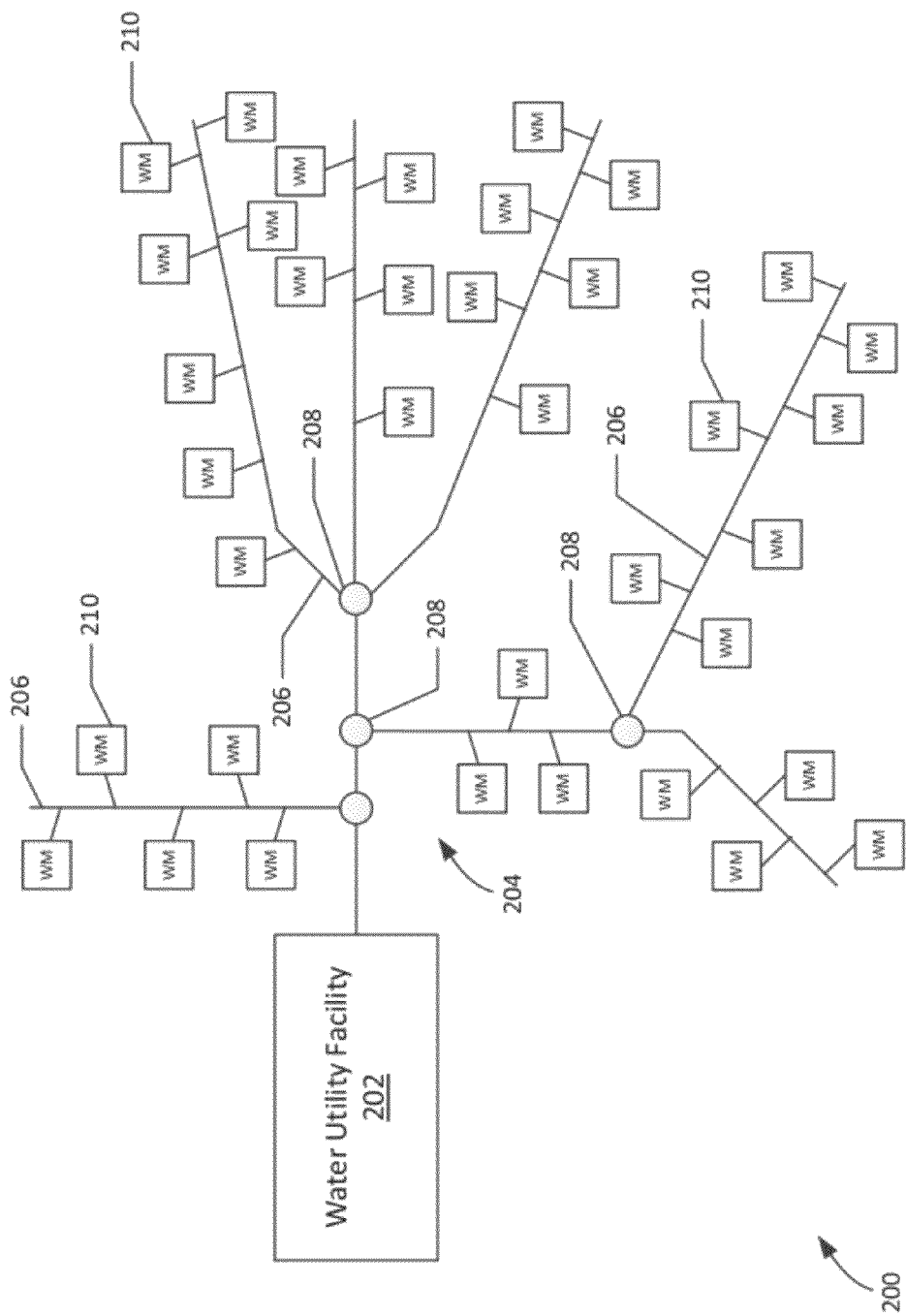
FIG. 2 is a schematic layout of an example water district in which a water monitoring system could be installed and which could be analyzed with such a system, according to an example embodiment of the present disclosure.
Figure 3:
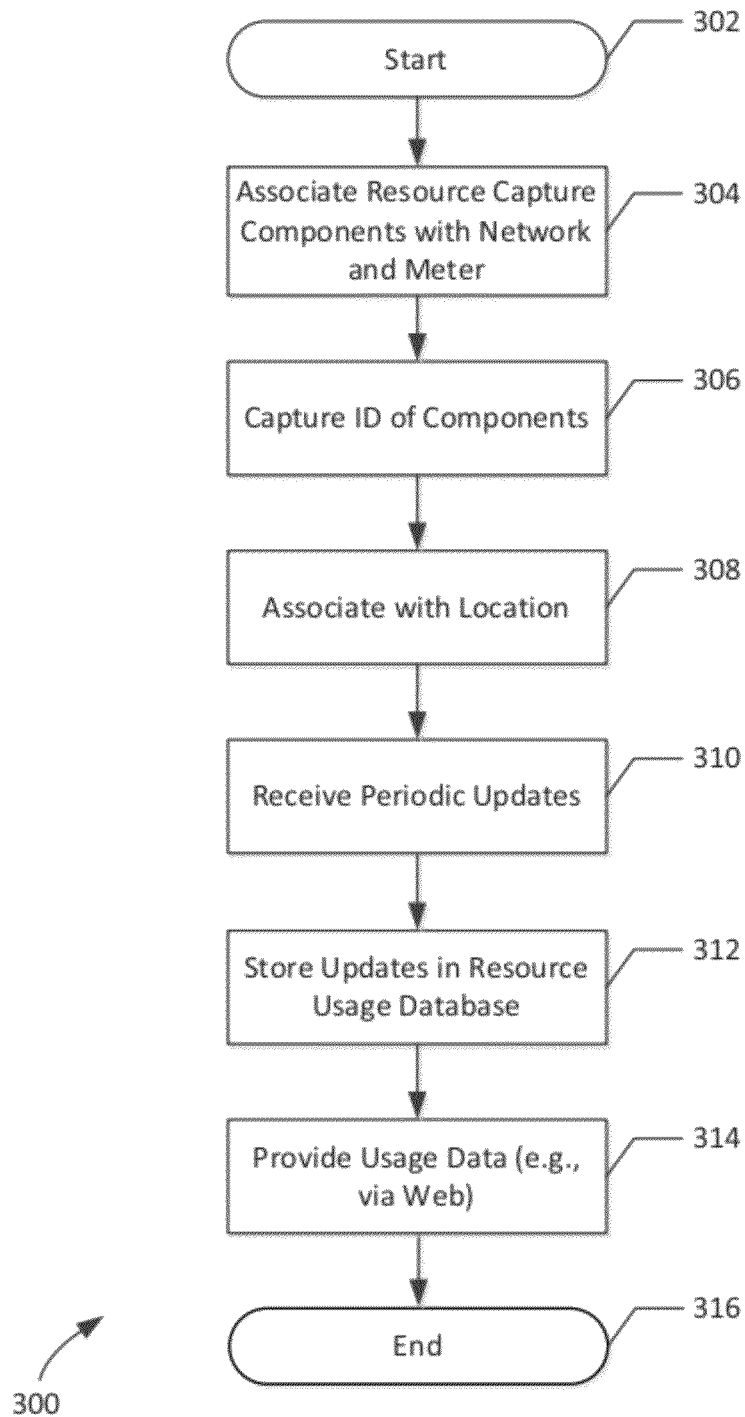
FIG. 3 is a flowchart of a method of operation of a satellite-based low power resource meter reading system, according to an example embodiment.
Figure 4:
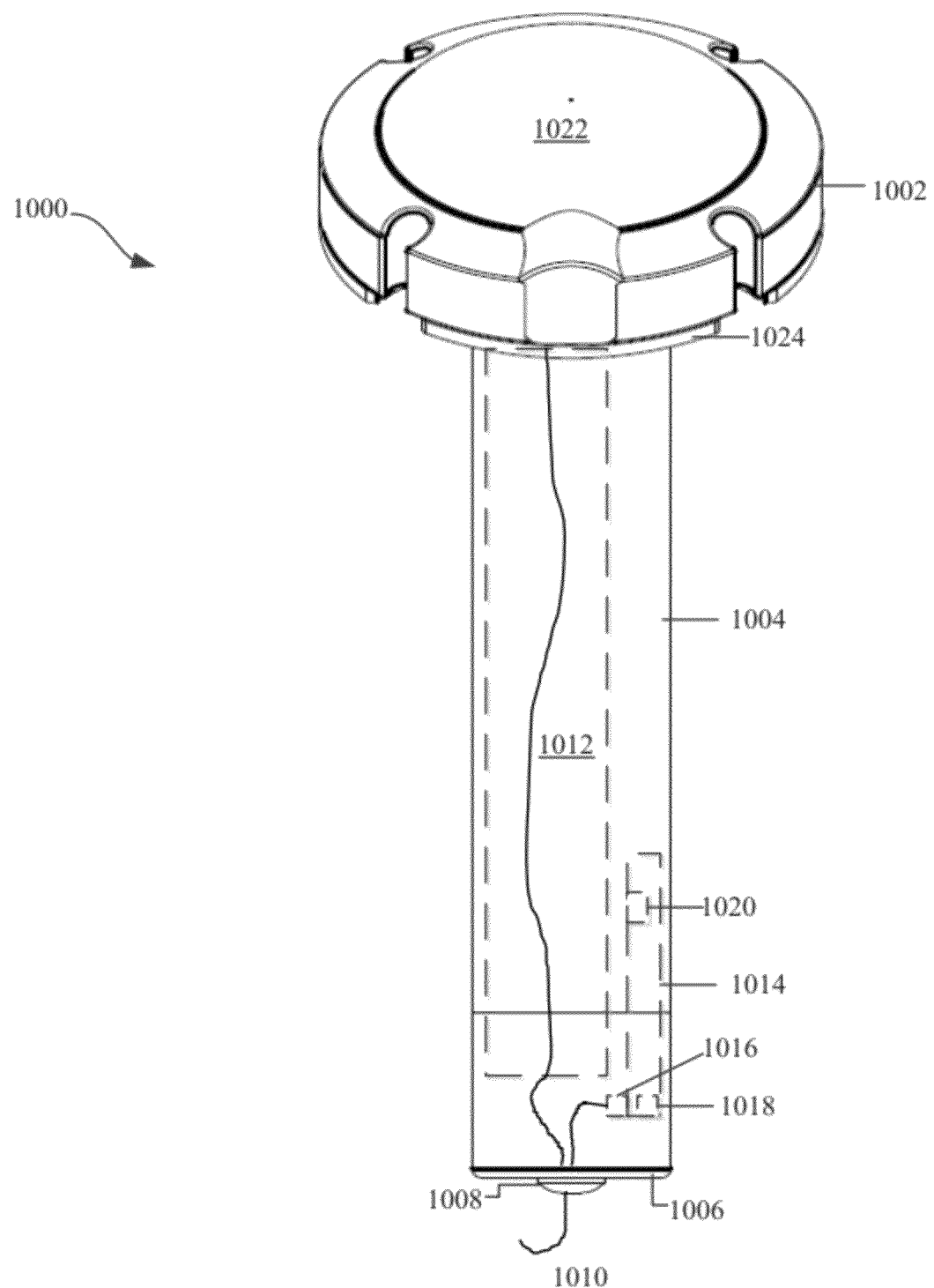
FIG. 4 is a perspective view of an example water meter reading device according to a possible embodiment of the present disclosure.
Figure 5:
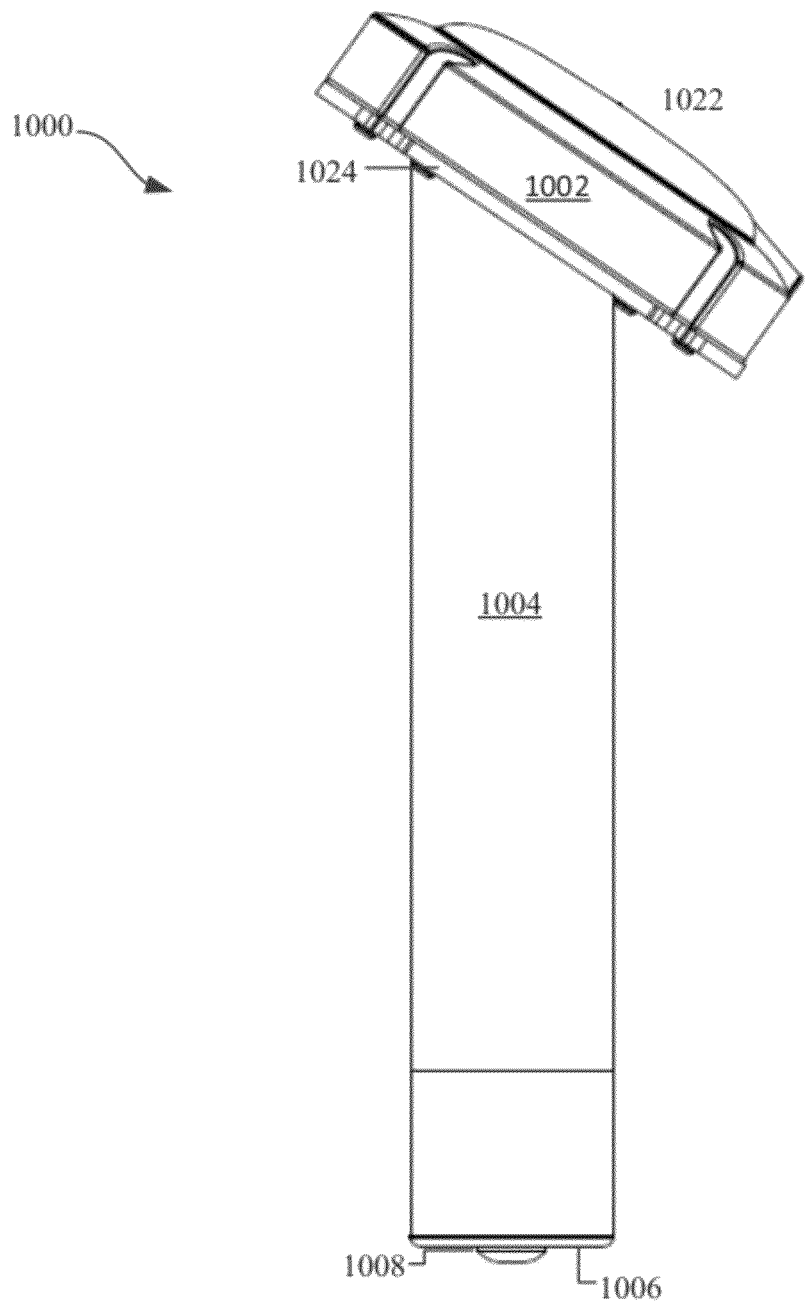
FIG. 5 is another view of the example water meter reading device of FIG. 4.
Figure 6:
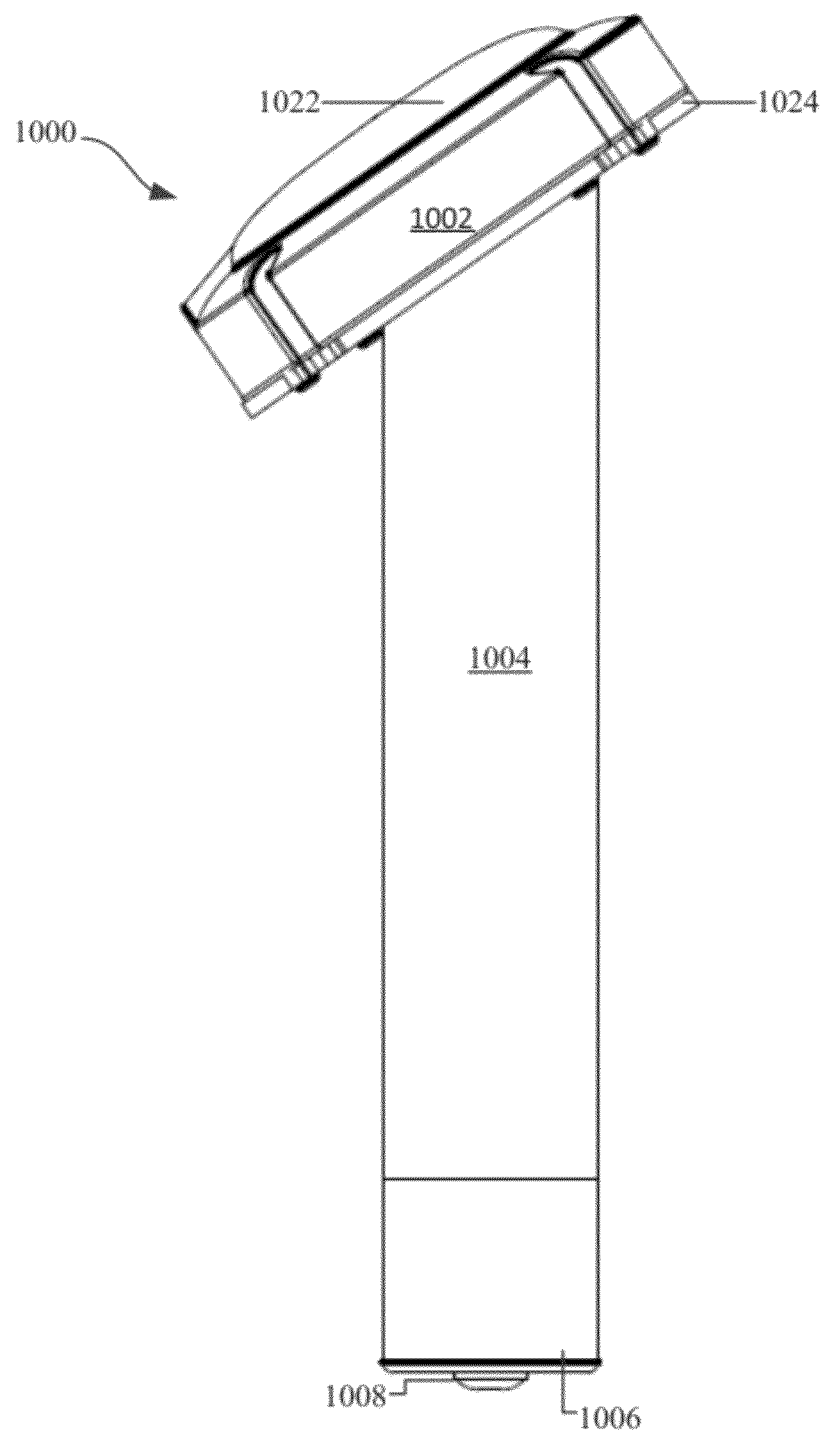
FIG. 6 is another view of the example water meter reading device of FIG. 4.
Figure 7:
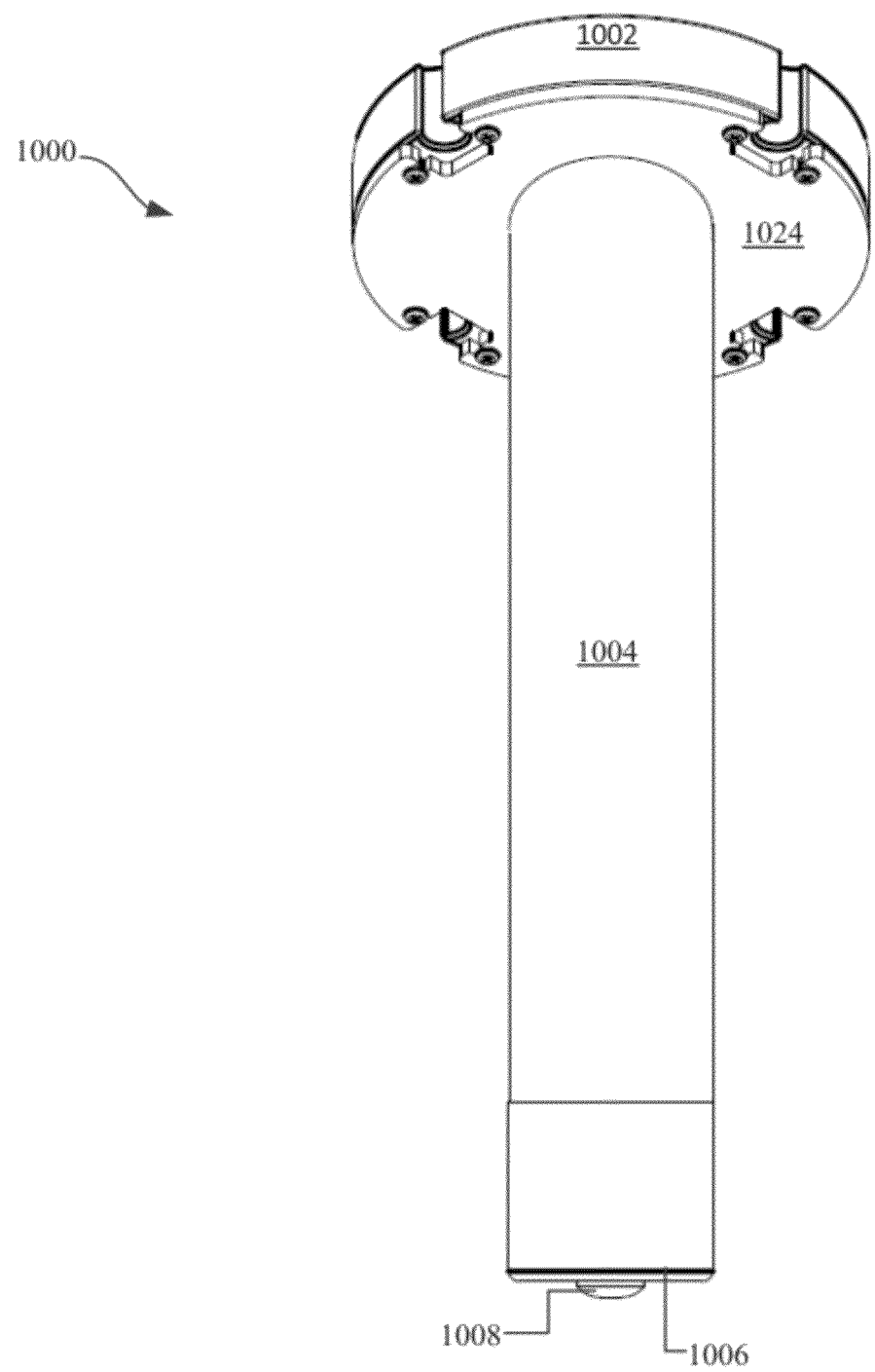
FIG. 7 is another view of the example water meter reading device of FIG. 4.

Referring now to FIGS. 1-3, systems and methods for an example embodiment of satellite-based low power resource meter reading arrangement are disclosed. The systems and methods discussed herein can be adapted to a variety of uses, for example, for monitoring usage or status of meters associated with assets, such as utility resources (e.g., water, gas, or electricity), or for monitoring other types of widely dispersed assets, such as oil wells, irrigation systems, or various types of natural resources. In general, the term "meter" corresponds with any electrical or mechanical system capable of monitoring and measuring usage or status of a particular resource or asset.

FIG. 1 illustrates an example satellite-based low power resource meter reading system 10, according to an example embodiment. In the embodiment shown, the system 10 includes a satellite 12 communicatively connected to a plurality of utility resource usage capture components 100, as well as to a base station 14.

Each of the utility resource usage capture components 100 is generally constructed for periodic communication with the satellite 12. Generally, each utility resource usage capture component 100 can be associated with a utility resource usage meter, shown as water meters 16a-b. In various embodiments, the water meters 16a-b are associated with different resource users 18a-b (e.g., utility customers), and are placed at different locations in a utility distribution system, such as the water district of FIG. 2. In such embodiments, the water meters 16a-b can be a same type of water meter, or can be different types of water meters, such as would be manufactured and provided to resource users 18a-b by different manufacturers. As discussed below, each of the utility resource usage capture components 100 are configured to interrogate meters having a variety of different communication standards, and to receive and translate responsive data for communication back to a centralized system via the satellite 12.

Generally, the water meters 16a-b can be located either in proximity to data and/or power delivery services, or separate from such services. This is because, as further discussed below, each of the utility resource usage capture components 100 is generally configured such that no external power source (e.g., an electrical source or some regenerative form of energy) or data network (wired or radio frequency-wireless) is required to be present. As such, the system 10 is particularly adapted to be capable of distribution across rural or sparsely populated or undeveloped areas where such wired or wireless communications networks and wired power might be present. Additional details regarding operation of the utility resource usage capture components are provided in part B, below.

In the embodiment shown, the base station 14 is generally depicted as providing bidirectional communication with one or more satellites 12, i.e., for receiving data from the utility resource usage capture components 100 and sending configuration information and/or data requests to one or more such components 100. The base station 14 is communicatively connected to one or more message relay devices 20, represented as a computing system in the embodiment shown. The relay device 20 as shown provides data aggregation and communication to a third party system on behalf of a satellite service provider.

In various embodiments, the satellite 12 can be either part of a network of similar satellites, such as a low earth orbit satellite or a geostationary satellite. Regardless of the type used, the base station 14 and utility resource usage capture components 100 are configured to communicate using the satellite 12. Although it is noted that one satellite is described herein, it is possible that, depending upon timing and positioning of the base station 14 and the utility resource usage capture components 100, more than one satellite 12 may be used to establish a communicative connection from the utility resource usage capture components 100 to a remote data collection system.

In some embodiments, the satellite 12, base station 14, relay device 20 and optionally a portion of the utility resource usage capture components 100 configured for satellite communication can be made available by one or more satellite communications providers, such as the combination of Skywave Mobile Communications of Ottawa, Ontario, and Inmarsat PLC of London, United Kingdom. In alternative embodiments, other satellite providers could be used as well.

In the embodiment shown, a utility resource management computing system 22 is communicatively connected to the relay device 20 by any known communicative connection (e.g., the Internet). The utility resource management computing system 22 generally is administered by a utility resource usage tracking provider. In the case where the utility being tracked is a water utility, the utility resource management computing system 22 can be administered by an entity that provides data services to one or more water districts.

The utility resource management computing system 22 manages a utility resource usage database 24, which stores data regarding the locations and operation of each of the utility resource usage capture components 100. Generally, the utility resource usage database 24 gathers and transmits data describing the health and status of the various utility resource usage capture components 100, and stores a record of the registered utility resource usage capture components 100. The utility resource management computing system 22 receives periodic data from each of the components 100 via the satellite 12, base station 14, and relay device 20, including for example an operating health and status of each of the utility resource usage capture components 100 and a reading from each of the associated and connected water meters 16a-b. Although in some embodiments discussed herein daily updates are provided, it is recognized that other frequencies could be used as well, such as hourly updates in the event an alert or other abnormal usage pattern is detected.

In the embodiment shown, a web server 26 is communicatively connected to the utility resource management computing system 22, and provides a web application to one or more computing systems 28a-b for accessing data in the utility resource usage database 24, for example via the Internet 29. The web application hosted by web server 26 can provide a variety of functions, including registration and entry of details regarding each of the utility resource usage capture components 100 by an installer of those components, user/customer management, transmitting commands to or viewing status of one or more utility resource usage capture components 100, or analyzing resource usage patterns, using a variety of dashboards. Additional details regarding contents and usage of data in the utility resource usage database 24, as well as operation of the web server 26, are provided below in Parts C-D.

In the embodiment shown, computing system 28a-b are associated with users 30a-b, who can represent, in various embodiments, different roles having access to different portions of a web application provided by web server 26. For example, users 30a-b could be administrators of the system 10, or in other words affiliated with an entity providing access to the data in the system 10 and facilitating collection of that data. One or more of the users 30a-b could alternatively represent a customer of that entity, such as a water district or other utility electing to user the entity for data management and which corresponds to a utility resource provider. Still other users could be resource users 18a-b (i.e., customers of the utility resource provider), such that a user could track his/her own resource usage.

In some embodiments of the system 10, the system is particularly adapted for use in connection with one or more water utilities, such as a rural water district. However, other types of utilities or resource distribution systems could be equivalently be monitored. For example, an electrical or gas utility could be monitored, as well as an oil well, an irrigation management system (e.g., for a farm or golf course), a water rights management and monitoring system (e.g., for tracking stream levels or flood alerts), or a gas storage system. Other possibilities exist as well.

Referring now to FIG. 2, a schematic layout of an example water district 200 is shown, in which a water monitoring system could be installed and which could be analyzed with such a system. The water district 200 generally includes a water distribution facility 200 as well as a hierarchical water conduit system 204. As seen in the schematic layout of water district 200, the water conduit system 204 includes a plurality of branches 206. In the topology of the water conduit system 204 as shown, a line meter 208 is placed at each branching point from which branches 206 extend. Additionally, along each branch, a plurality of water taps can be extended to customers, illustrated as separate water meters 210 (each denoted as "WM").

In the context of a water district such as district 200 as shown, it is instructive to determine which particular water users are consuming the greatest amount of water, as well as which branch 206 consumes the most water. For example, if a particular user is consuming a great deal of water, it may be due to a failure of a pipe at that user's location. It may also be instructive to compare a flow of water through a particular line meter 208 relative to the water meters (e.g., meters 16a-b) downstream of that line meter, for example to determine an overall loss within that branch 206. As further discussed below in Part D, such analysis is possible based on placement of utility resource usage capture components 100 at both the line meter 208 and the billable water meters 210 within the water district 200.

FIG. 3 is a flowchart of a method 300 of operation of a satellite-based low power resource meter reading system is shown. The method 300 generally corresponds to overall operation of the system 10 of FIG. 1, according to one possible embodiment. Although the method 300 describes registration and operation within a system 10 in general terms, additional details below may be incorporated as well, from Parts B-D.

In the embodiment shown, the method 300 is instantiated at a start operation 302, which corresponds to initializing installation of a utility resource usage capture component within a satellite-based low power resource meter reading system 10. The method 300 further includes associating a utility resource usage capture component with the network and with a particular meter (operation 304). This can include, for example, electrically connecting a resource meter to a utility resource usage capture component, as well as registering the utility resource usage capture component as active in a tracking database, such as utility resource usage database 24 of FIG. 1.

An identifier capture operation 306 corresponds to capture and registration of identifiers of the meter and utility resource usage capture component, such that it is known that a reading from a particular utility resource usage capture component relates to a particular meter. A location association operation 308 corresponds to associating the meter and utility resource usage capture component to a user, account, and utility in association with which the resource usage is tracked. This can include, for example, receiving a meter identifier and/or serial number associated with the meter affiliated with the particular utility resource usage capture component.

Following operation 308, the utility resource usage capture component is registered within a system for use. Periodic update operation 310 corresponds to receipt of updates from the utility resource usage capture component, for example on a daily or hourly basis. It is noted that generally, when updates are not obtained from each utility resource usage capture component, that component resides in a low power mode, such that daily power consumption of each utility resource usage capture component is kept low. Each periodic update received in operation 310 can take a variety of forms; in general, the update will include a meter reading, an identifier of the utility resource usage capture component from which the reading is obtained, and a health status of the utility resource capture component. Health status can include, for example, a voltage of the power source within the utility resource usage capture component (e.g., to determine remaining battery life), any error codes which may have arisen, and a message type. Other data fields can be incorporated as well, in various embodiments.

In various embodiments, the periodic update operation 310 occurs on a daily basis, for example to provide daily updates regarding resource usage or status, as well as health information regarding the component. Optionally, in some embodiments a remote system, such as utility resource management computing system 22, could change this period, for example to hourly updates, in the event of detection of abnormal usage patterns or health status information.

A storage operation 312 stores the received updates in a database, such as utility resource usage database 24. Additionally, usage data is provided in operation 314, for example by allowing resource providers and resource users to access usage data via a web application hosted on a web server (e.g., web server 26 of FIG. 1). The method 300 is terminated generally at an end operation 316.

In various embodiments, additional features could be included in method 300 as well. For example, the utility resource management computing system 22 can assess the information received from each component 100, and determine whether, for example usage patterns associated with a resource are outside of a given threshold, or whether health data associated with a component indicate the possibility of a failure. As such, additional actions may be dictated by the data, such as changing a frequency or period of updating from one or more such components.

Referring generally to FIGS. 1-3, is recognized that, within the system 10, each of the utility resource usage capture components 100 can be configured to communicate with a satellite at different times, to disperse over the course of a day the readings received from each of the components. For example, each of the utility resource usage capture components 100 could be assigned a random time within a particular window of time during the day (e.g., during the night when resource usage is lowest) at which to awaken and transmit data. Since data communication periods are typically short (on the order of about 30 seconds), this allows the communications to be spaced apart for security and convenience purposes.

B. Utility Resource Usage Capture Component (e.g., Water Meter Reading Device)

Now referring generally to FIGS. 4-19, additional details regarding embodiments of a utility resource usage capture component, such as component 100 of FIG. 1, are provided. In general, the utility resource usage capture component 100 is configured to be placed outdoors at a remote location for an extended period of time without access to power, such that the component is configured to operate in a low power state when not communicating with a satellite or reading a meter. Using a utility resource usage capture component 100, it is possible to capture quality or status measurements for a variety of different types of resources located anywhere worldwide, without special configuration for different environmental features, communication protocols, or connectivity issues.

Although in FIGS. 4-19 the utility resource usage capture component 100 is discussed in terms of its application as a water meter reading device, it is recognized that many other possible applications for such a component are possible, and would only require adaptation of an interface to that particular meter or monitor for adaptation to such a purpose.

FIGS. 4-10 illustrate one possible embodiment of a water meter reading device 1000. The water meter reading device 1000 is one example of the utility resource usage capture component 100. In general, the water meter reading device 1000 is configured for use with a geostationary satellite system, and for connection to a variety of different types of water meters.

Figure 15:
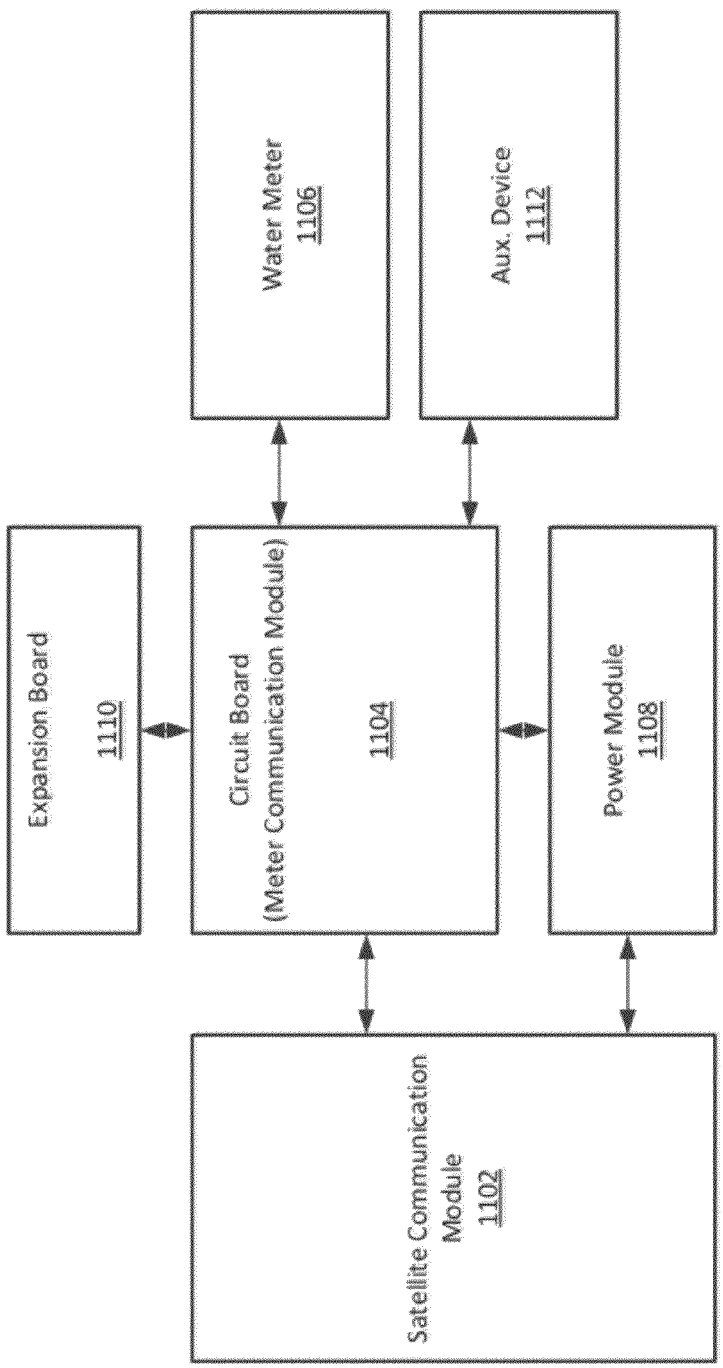
FIG. 15 is a generalized schematic diagram of an example water meter reading device
Figure 16:
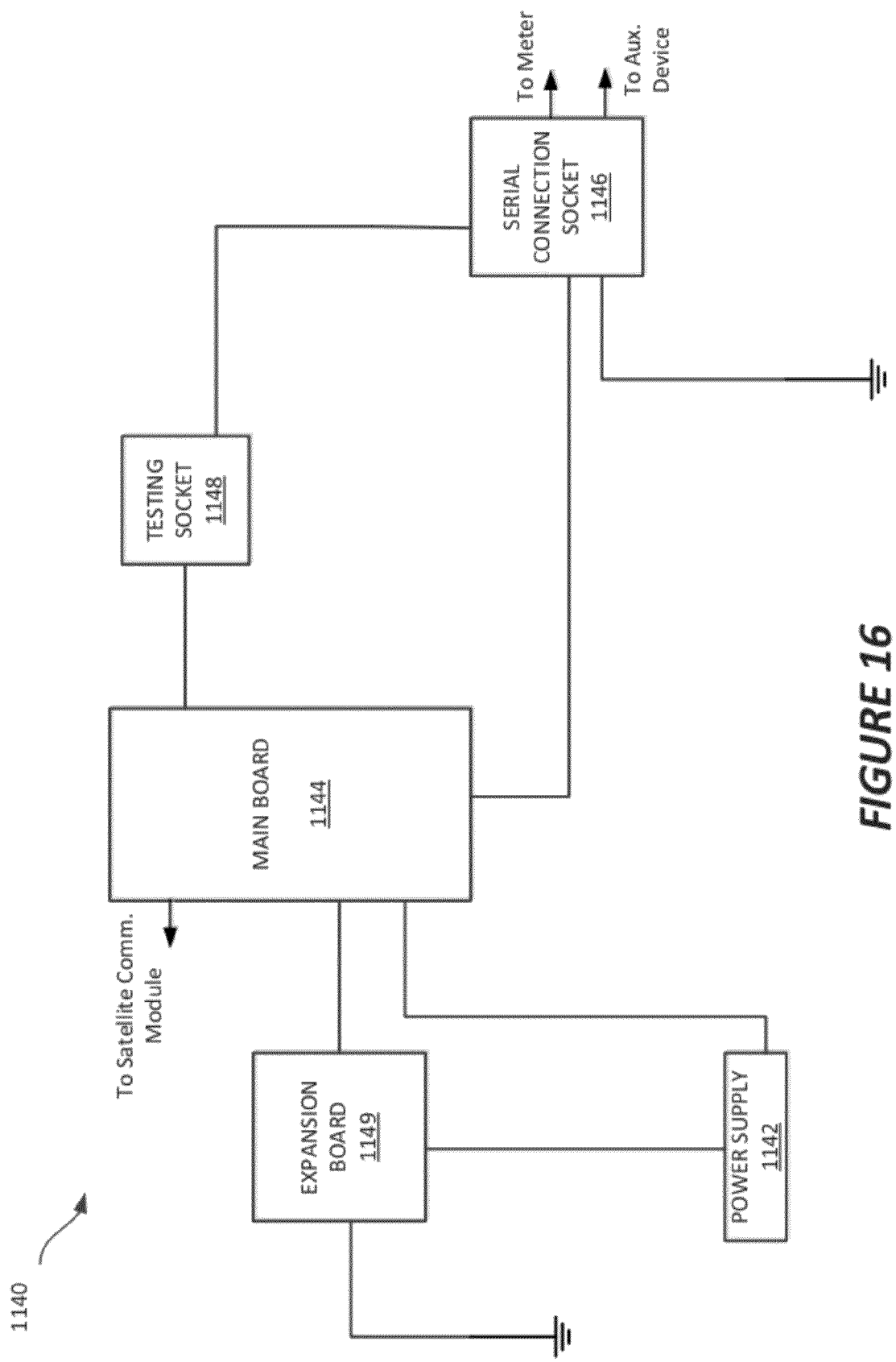
FIG. 16 is a generalized schematic diagram of one example of a circuit board that can be included in the example water meter reading device of FIG. 15.

In the example as shown, the water meter reading device 1000 includes a satellite communications module 1002, a tube 1004, a bottom cap 1006, a port 1008, and a cable 1010. The satellite communications module 1002 includes a modem/antenna 1022 and a mount 1024. The tube 1004 includes a battery pack 1012 and a circuit board 1014. The circuit board 1014 includes, among other features, a first connector 1016, a second connector 1018, and a microcontroller 1020. Other features of a circuit board such as board 14 useable for inclusion in device 1000 are illustrated in FIGS. 15-16, below.

In use, the water meter reading device 1000 is coupled to a water meter and is configured to receive and transmit water meter readings of the water meter. In alternate embodiments, the water meter reading device 1000 may be connected to various other devices, including sensors, instruments, and other apparatuses connected to the water meter. The water meter reading device 1000 is generally mounted in an upright position, for example using a standard hose-clamp type bracket or other type of frictional or clamping system. The water meter reading device 1000 can be mounted to any convenient location generally away from large obstacles which may prevent satellite communications access (e.g., a large obstruction positioned to the south from the oriented device 1000), and with the satellite communications module 1002 oriented generally for best satellite coverage. The water meter reading device 1000 remains in a low power sleep state or wait state until awoken by a timer, such as might execute within the satellite communications module 1002, or based on receipt of a signal from a remote satellite (e.g., satellite 12) at the satellite communications module 1002. At such time, the device 1000 interrogates the connected device(s). Interrogation may occur in various forms, for example, by a series of twelve pulses (e.g., as discussed in connection with FIGS. 18-19, below). Once interrogated, the connected device(s)

responds with encoded data. The encoded data may be indicative of various readings, including water meter readings, leak detection data, sensor readings, or the like. Because the water meter reading device 1000 is configured to operate with any water meter, the data received will often differ depending on which meter or device is connected to the water meter reading device 1000. Therefore, the water meter reading device 1000 is configured to translate any data received into a standardized format. The circuit board 1014 receives the data, decodes it, and transfers the standardized data to the satellite communications module 1002. The modem/antenna 1022 then transmits the decoded data to a remote location. Upon completion, the device 1000 re-enters a low power mode.

The satellite communications module 1002 is configured to receive and transmit signals through the use of the modem/antenna 1022. For example, the modem/antenna 1022 may awaken at a predetermined time based on an internal clock, and enter an operational mode in which meter and device status is to be collected and communicated. Upon collecting and translating data received from any connected devices, the circuit board 1014 transfers the encoded data to the satellite communications module 1022. The modem/antenna 1022 then transmits the data to a satellite, which relays data to a collection location, at which data can be gathered. The modem/antenna 1022 may be any suitable modem and associated antenna capable of transmitting data to a desired satellite system. In alternative embodiments, a pulse low interrupt signal can be received from a satellite, and acts as a request from a remote location that the water meter reading device 1000 enter an operational mode, with data relayed back via the satellite from which the interrupt signal is received.

In some embodiments, the satellite communications module 1002 is configured to operate using very low power, that is to minimize a number of switches between satellites that take place. For example, although typical satellite communications modules 1002 may include a global positioning system, typically such a circuit is excluded from the satellite communication module, due to lack of movement of the module 1002 once installed. Additionally, although in some types of satellite communications modules a "best fit" satellite providing a best signal to noise ratio is negotiated, in the module 1002 firmware is configured to retain a satellite connection if feasible, thereby avoiding renegotiating a satellite connection, which otherwise would consume an undesirable amount of power (and therefore is avoided if at all possible).

In some embodiments, the modem/antenna 1022 is oriented in a canted position, as shown in FIGS. 4-7. In such embodiments, the modem/antenna 1022 may be angled in any direction that enables it to receive signals from a remote satellite. In such embodiments, the satellite communications module 1002 is generally canted, and used in connection with cylindrical pipe 1004, to provide a wide range of possible directions to aim the satellite communications module 1002 when the device 1000 is mounted in a vertical orientation. The amount of canting required may vary based on which satellite is used in the system. For example, in comparison to the embodiment illustrated in FIGS. 13-16 which uses a low earth orbit satellite system (and hence has no canting, but instead uses a horizontal arrangement), the embodiment of FIGS. 4-10 is configured for use with geostationary satellite system which uses satellites that are positioned along the southern horizon when the satellite communications module 1002 is placed in the United States. In other embodiments, the satellite communications module 1002 may shaped differently so that it is configured to communicate with various other remote locations.

The satellite communications module 1002 is supported by the mount 1024. The mount 1024 acts as a coupling interface between the pipe 1004 and the satellite communications module 1002 and incorporated modem/antenna 1022. The mount 1024 is rigidly attached to the satellite communications module 1002 by a fastening means (see FIG. 9). The fastening means may be any mechanical fastening device, such as, for example, screws, bolts, metal rods, or the like. Though the satellite communications module 1002 is secured to the mount 1024, the fastening means enable easy removal of the satellite communications module 1002 from the device 1000 for purposes of installation, maintenance, repairs, or the like. The fastening means is preferably tamper-resistant or at least tamper-evident, for example using a security type screw arrangement. In some embodiments, the antenna mount 1024 also includes a seal, described in more detail below.

The pipe 1004 is a hollow housing which acts as a support for the antenna assembly 1002 and a protective enclosure for the battery pack 1012 and the circuit board 1014. The pipe 1004 can be constructed from a variety of materials, and is typically made from an environmentally resistant material, such as PVC. The battery pack 1012 provides power to the water meter reading device 1000. Because the device 1000 often remains in a low power state, such as a sleep or wait mode, the battery pack 1012 may last up to or longer than ten years without needing replacement. The pipe 1004 also acts as the body of the device 1000 and provides connectivity to any connected devices, such as, a water meter. Specifically, the device is connected to any other devices through the wire 1010 and the port 1008. The port 1008 can be configured to accept any type of wire 1010, and can include a gasket providing an environmental seal around one or more wires passing therethrough. The wire 1010 may be one wire or multiple wires, as needed for the operation of the water meter reading device 1000. For example, the wire 1010 may connect to both the battery pack 1012 and the circuit board 1014, or may include additional wires for remote controlling a meter or other external device. In other embodiments, the wire 1010 may include two or more wires for connection to the components, respectively.

The circuit board 1014 is directly coupled to any connected devices through the wire 1010. In the embodiment, the circuit board 1014 includes the first connector 1016 and the microcontroller 1020. The first connector 1016 is configured to accept a connection from any connected devices, such as the water meter. Thus, any data received from the water meter is sent directly to the circuit board 1014 for translation. The data is sent to the microcontroller 1020 which decodes the encoded data from any connected devices to a standard format (discussed in greater detail below). Upon translating the data, the microcontroller 1020 sends the encoded data to the satellite communications module 1002 for transmittal to a remote location. The circuit board also includes the second connector 1018. In some embodiments the second connector 1018 is a testing socket which can be used for debugging or other testing activities. In other embodiments, the second connector 1018 may have the same functionality as the first connector 1016 or acts as a default connector for any future connection needs of the system.

Figure 8:
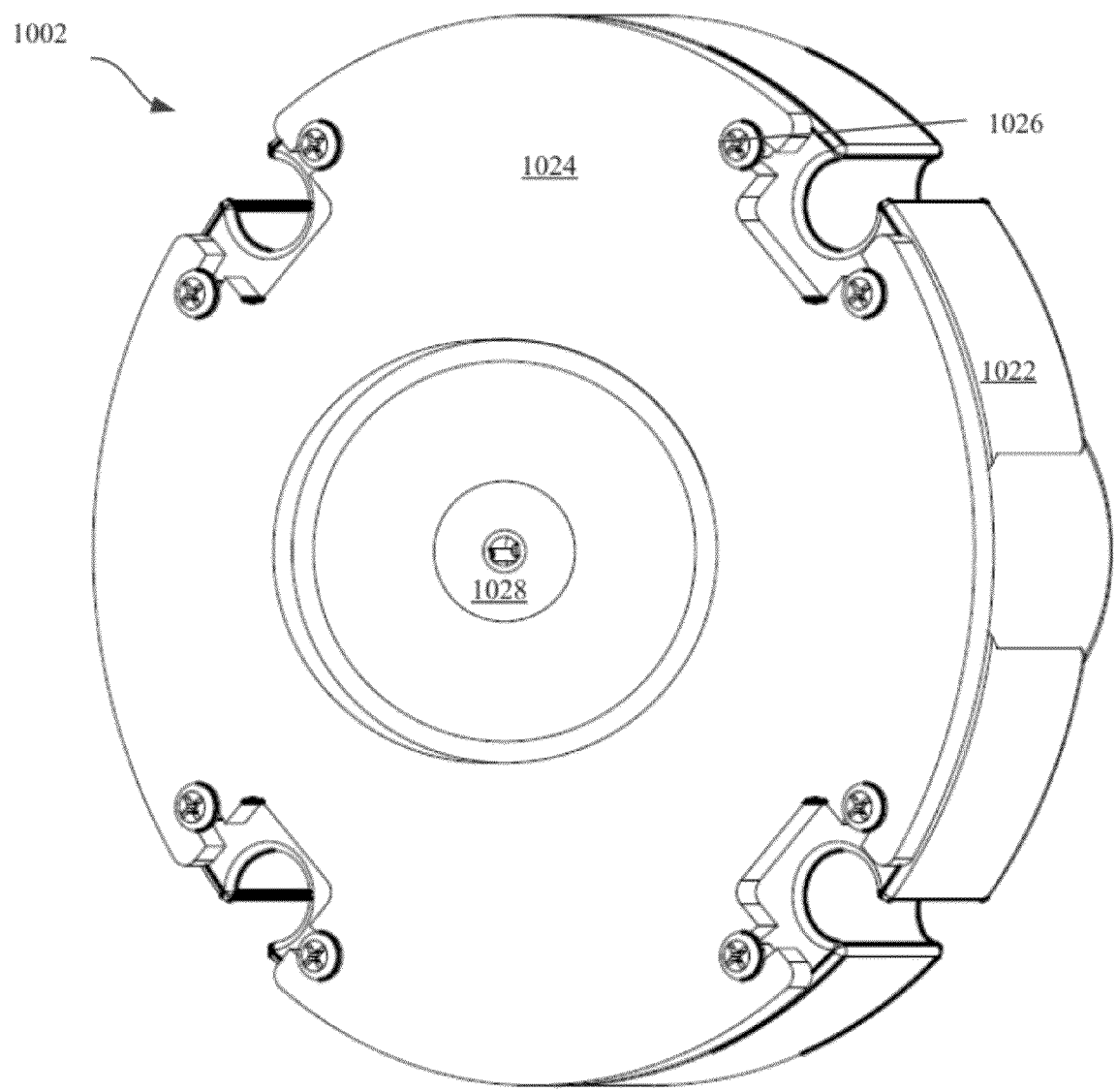
FIG. 8 is a bottom view of the antenna assembly of the example water meter reading device of FIG. 4.

Referring to FIG. 8 specifically, a bottom view of the satellite communications module 1002 is shown. The satellite communications module 1002 includes the modem/antenna 1022, the mount 1024, fasteners 1026, and a sealing connector 1028.

The satellite communications module 1002 is securely fastened by the fasteners 1026. In the example embodiment, the fasteners 1026 are screws. The screws 1026 are positioned around the antenna mount 1024 to provide equal support; however, in alternate embodiments a greater or lesser number of fasteners may be utilized. In some embodiments, the fasteners 1026 can be any variety of fastener which can provide physical fastening such as, for example, bolts, buckles, hooks, clasps, metal rods, or the like. The method of fastening allows somewhat easy removal of the modem/antenna 1022 from the mount 1024, for example for security purposes. Removal may be necessary for a variety of reasons including, maintenance, removal, efficient installation, or the like.

The satellite communications module 1002 also includes the sealing connector 1028. The sealing connector 1028 allows connection of the circuit board 1014 to the satellite communications module 1002, while also providing water protection for the device 1000. Specifically, the sealing connector 1028 interfaces with the mount 1024 to ensure that water or other materials do not enter the pipe 1004 or satellite communications module 1002 and damage the battery pack 1012 or the circuit board 1014. The sealing connector 1028 is designed to be inserted during assembly into the satellite communications module 1002 and includes a wire leading into the pipe 1004, while forming a sealing connection to the mount 1024 so that water is discouraged from seeping into the pipe 1004. The sealing connection can be any kind of closure for this purpose, such as, for example, an O-ring, a toric joint, a mechanical gasket, silicone caulk, or the like. In the event of water seepage into the pipe 1004 due to a failure in the sealing connection, the pipe 1004 may come equipped with a bottom drain (seen in FIG. 10B) which enables removal of unwanted water from the pipe 1004.

Figure 9A:
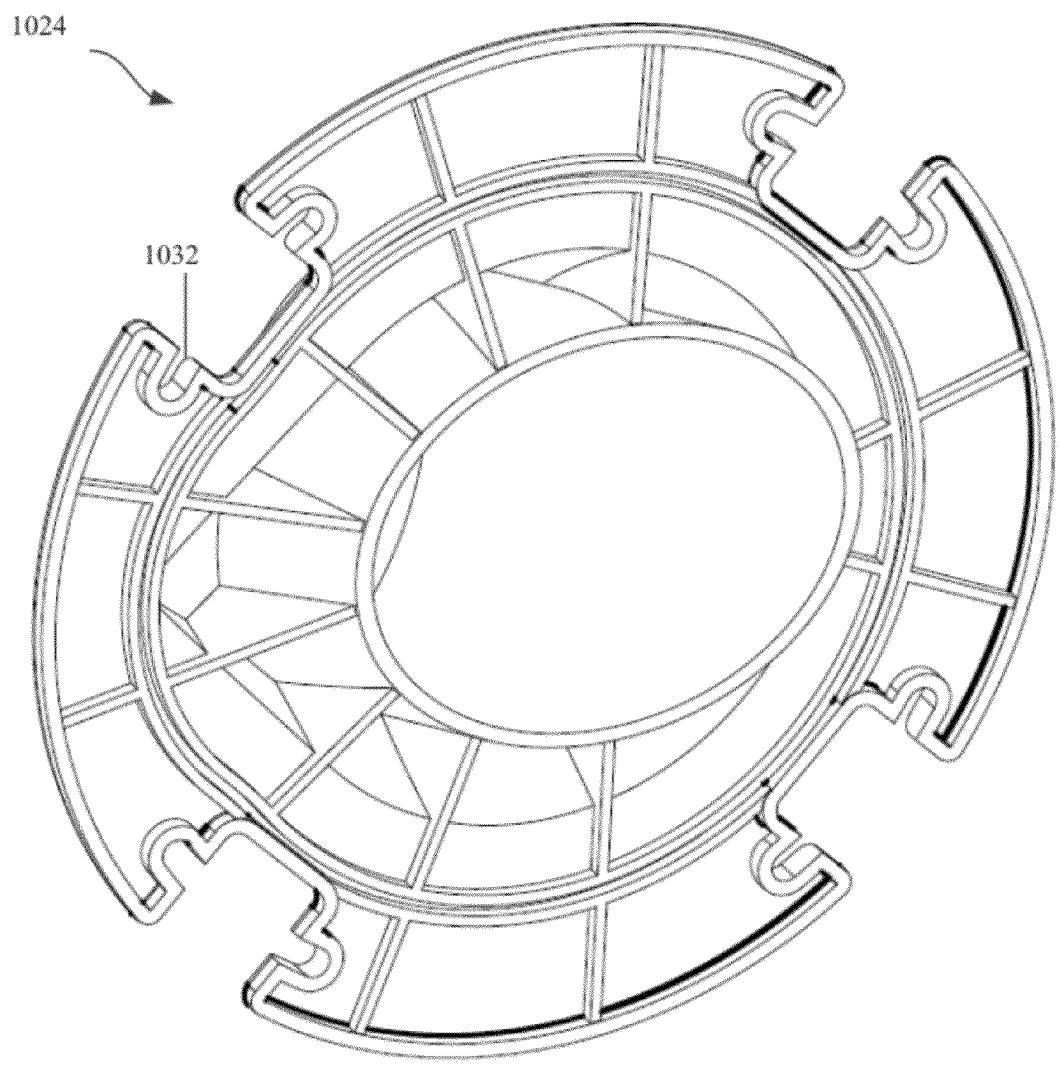
FIG. 9A is a top perspective view of the antenna mount of the example water meter reading device of FIG. 4.
Figure 9B:
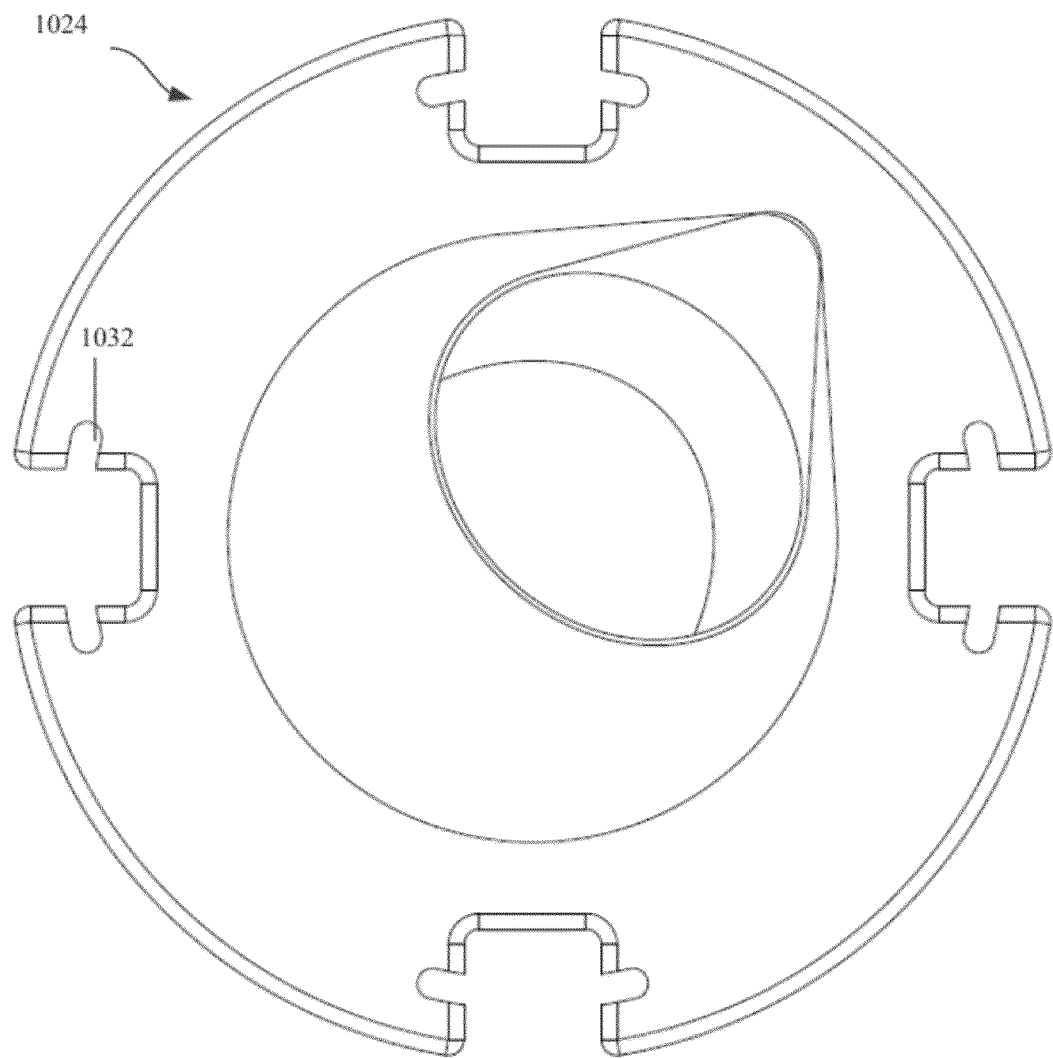
FIG. 9B is a bottom perspective view of the antenna mount of the example water meter reading device of FIG. 4.

Now referring to FIGS. 9A-9B top and bottom views of the mount 1024, unassembled from the device 1000, is illustrated. The mount 1024 includes fastener holes 1032. The fastener holes 1032 are hollow spaces configured to accept at least one fastener, such as the fasteners 1026. In some embodiments, more or less fastener holes 1032 are included in the mount 1024, based on the desired number of fasteners 1026. The fastener holes 1032 may be greater or smaller in size depending on the variety of fastener utilized.

Though the modem/antenna 1022 and the mount 1024 are illustrated with the configurations and shapes shown in FIGS. 8 and 9A-9B, various other designs may exist which allow the satellite communications module 1002 to efficiently transmit and receive signals to and from remote locations. Additional details regarding such a component are described below in connection with FIGS. 15-16.

Figure 10B:
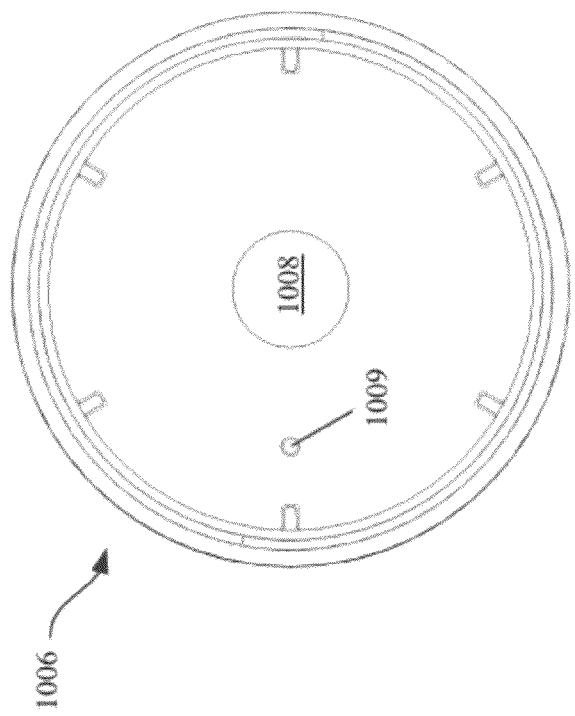
FIG. 10B is a top perspective view of the bottom cap of the example water meter reading device of FIG. 4, removed from the water meter reading device.
Figure 10A:
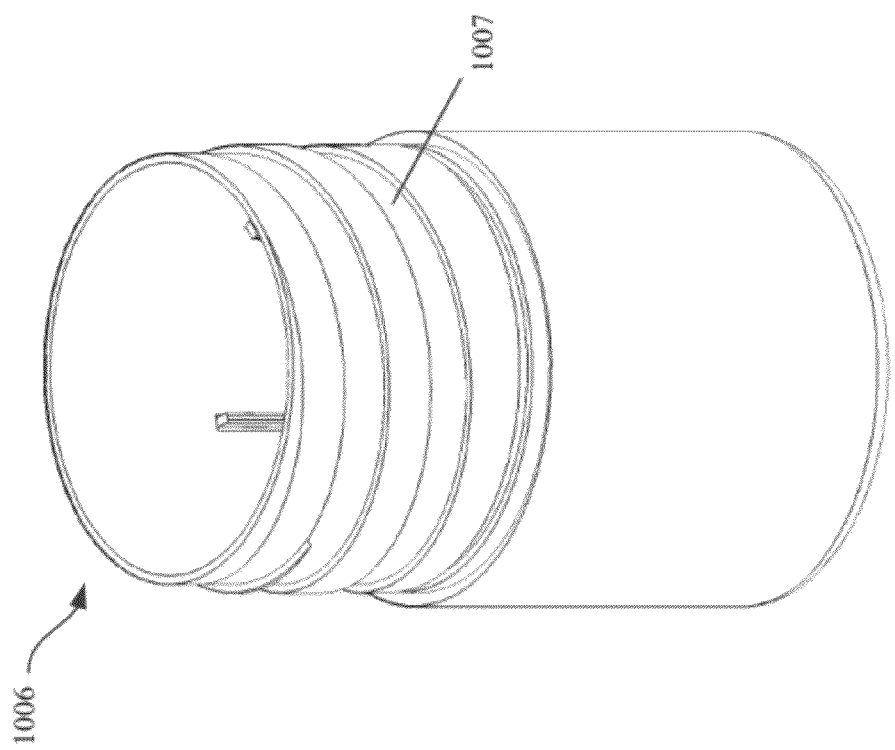
FIG. 10A is a side perspective view of the bottom cap of the example water meter reading device of FIG. 4.

Referring now to FIGS. 10A-10B, the water meter reading device 1000 also includes a bottom cap 1006. The bottom cap 1006 acts as a bottom support for the pipe 1004, and to encase components contained within the pipe. In some embodiments, the bottom cap 1006 is removable so that more components can be positioned within the hollow enclosure of the pipe 1004. In the embodiment shown, the bottom cap 1006 includes a threaded connection 1007 which feeds onto an inner thread (not shown) of the pipe. This provides for an environmental seal between the bottom cap 1006 and the pipe 1004, while allowing access to the interior of the pipe 1004 if needed for service. For example, in the event of a battery pack failure, the bottom cap 1006 can be disconnected from the pipe 1004 to allow placement of another battery pack. In other embodiments, a second battery pack may be inserted into the pipe 1004 for added power even if the battery pack 1012 is fully operational. In still further embodiments, a second pipe having an analogous threading to the threaded connection 1007 at a top end and internal threading at a bottom end could be added at the joinder of the pipe and end cap, to extend the length of the overall device 1000 and allow additional interior space for additional batteries or circuitry, if additional battery life or functionality is desired.

In addition, the bottom cap 1006, in the embodiment shown, includes a drain hold 1009 positioned near the port 1008, to allow any moisture which may have entered the pipe 1004 to drain out from the pipe at a location away from any wiring, such that the moisture does not follow the wiring down out of the pipe 1004 to a connected meter.

Now referring to FIGS. 11-14, a second example embodiment of a water meter reading device 1050 is shown. Generally device 1050 corresponds to device 1000, but has a generally horizontally oriented satellite communication module 1052. The device 1050 is accordingly configured to use in connection with low earth orbit (LEO) satellite systems, in contrast to the arrangement of FIGS. 4-10.

Figure 13:
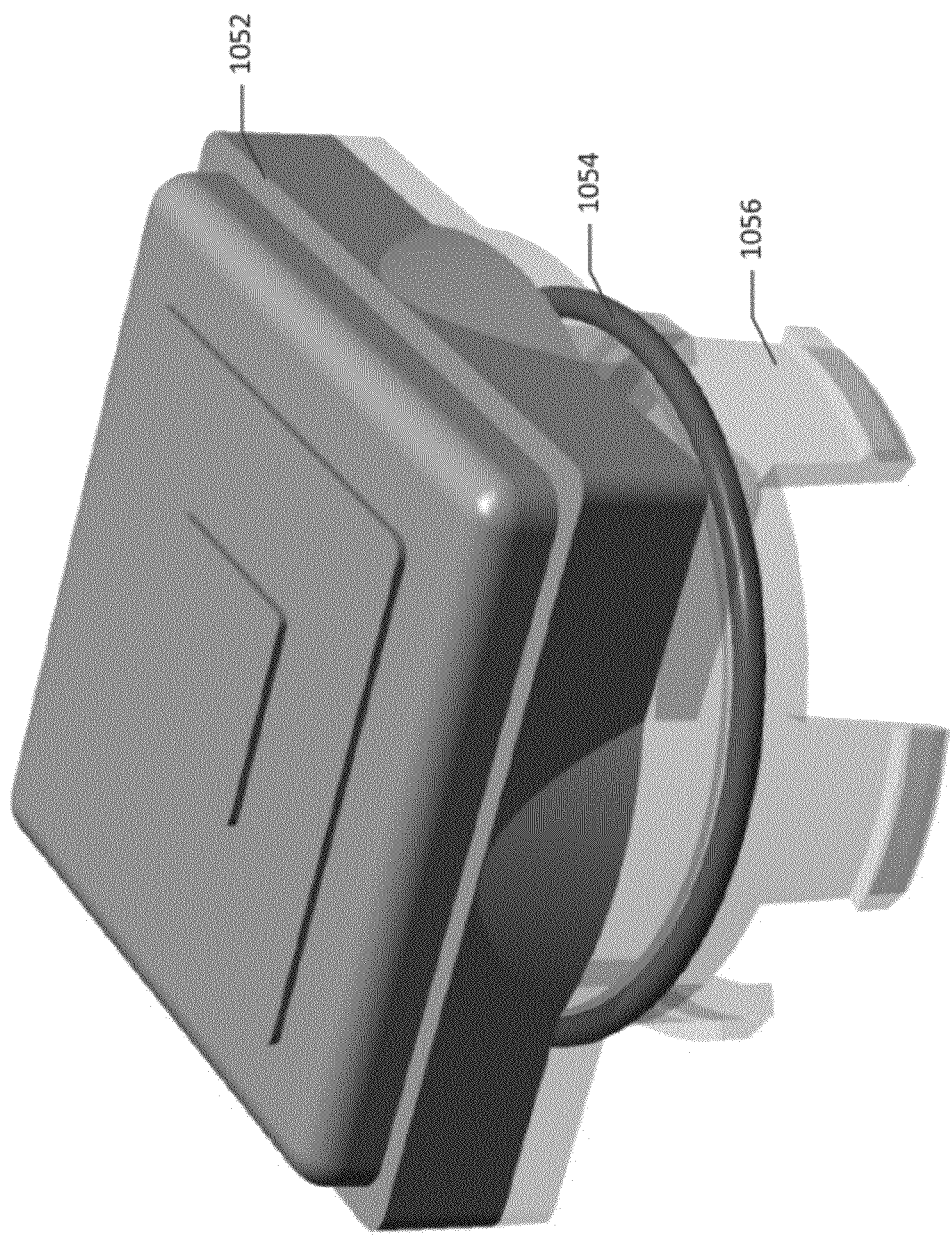
FIG. 13 is a close-up perspective view of a satellite communication module included in the water meter reading device of FIG. 11.
Figure 14:
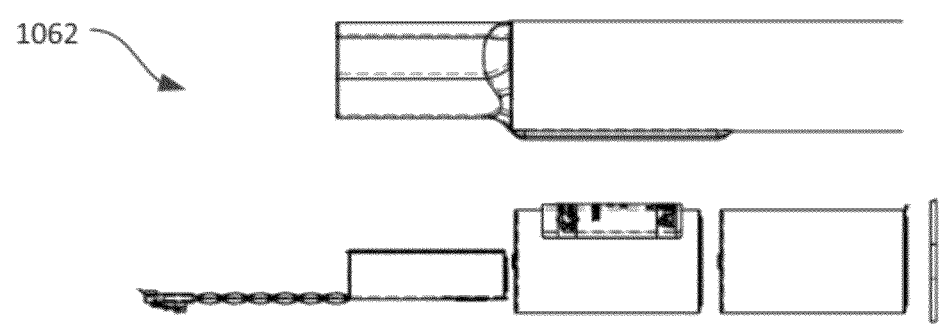
FIG. 14 is a side exploded view of a battery assembly included within the water meter reading device of FIG. 11.

As seen in FIGS. 12-13, in comparison to the arrangement of FIGS. 4-10, the satellite communications module 1052 has a snap-fit arrangement including an o-ring 1054 and latches 1056 which are inserted into a pipe 1058. Additionally, end cap 1060 has a snap fit connection, rather than a threaded connection. Gasket 1061 in the end cap corresponds to the port 1008.

Within the pipe 1058, a battery assembly 1062 is connected to and a circuit board 1064 and the satellite communications module 1052 by a wire 1066. In this embodiment, the circuit board is located nearer the satellite communications module 1052 than the battery assembly 1062, while in the embodiment of FIGS. 4-10 the circuit board is positioned to be accessible via the end cap 1006. As specifically illustrated in FIG. 14, the battery assembly 1062 includes a circuit board connector and associated battery modules which can be encased with an environmentally protective covering or sheath. Generally, the battery assembly can be constructed using a battery pack including one or more Tadiran lithium batteries, constructed using one or more Tadiran hybrid layer capacitors, for constant voltage over a life span of the battery and long life operation. Other battery assembly arrangements are possible as well.

FIG. 15 is a generalized schematic diagram of an example water meter reading device 1100 connected to a water meter 1106 and associated auxiliary device 1112, according to an example embodiment. The device 1100 generally corresponds to either of devices 1000, 1050 of FIGS. 4-14. The device 1100 includes a satellite communications module 1102 communicatively connected to a meter interface module 1104. The satellite communications module 1102 generally provides communication with a satellite system, as described above. The meter interface module 1104 is interconnected at a serial interface to a meter 1106, which can be any of a variety of types of meters. As further discussed herein, the meter interface module 1104 is configured to be interconnectable to a variety of different types of meters from a number of different manufacturers.

A power module 1108 is electrically connected to the satellite communications module 1102 and the meter interface module 1104, and provides power to those modules during operation. The power module 1108 can correspond, in some embodiments, to the battery assembly 1062 or battery pack 1012.

An expansion board 1110 can optionally be connected to the circuit board of the meter interface module 1104, and can include a variety of different functions as required by a particular application of the device 1100. For example, the expansion board 1110 can provide wireless data connectivity to the module 1100, for example using WiFi, ZigBee, Blue-Tooth, or other RF protocols. The expansion board 1110 can also integrate one or more additional sensors or sensor inputs, for example relating to weather or environmental detection. Alternatively, the expansion board 1110 can include control circuitry for managing control of one or more additional external electronic or electromechanical systems placed at the remote location where the device 1110 is located. In still further embodiments, the expansion board 1110 could include other types of interfaces, such as a radio link interface, an optical link interface, or a contact closure or pulse interface, and could be used to interface either the meter or an additional auxiliary device.

Additionally, an optional auxiliary device 1112 can be included in the overall system, and can be triggered or controlled by either the meter interface module 1104 or the expansion board 1110.

Now referring to FIG. 16, a schematic diagram is shown, in which the meter interface module 1104 is implemented on a circuit board 1140. The circuit board 1140 is one embodiment of the circuit board 1014 or circuit board 1064. The circuit board 1140 includes a power supply 1142, a main board 1144, a serial connection socket 1146, a testing socket 1148, and an expansion board slot 1149.

The main board 1144 functions in the same way as the microcontroller 1020. For example, the main board 1144 receives data packets from various connected devices via the serial connection socket 1146, which connects directly to any such device and a ground. The main board 1144 translates the data packets into a standardized format and transmits the newly decoded data to the antenna 1122 for transmittal to a remote location.

Data is received from a meter at the serial connection socket 1146 in a variety of formats, depending upon the type of meter to which the device is connected. Generally, in two example embodiments, data is received at the serial connection socket 1146 from either an absolute encoder register (e.g., as found in a Sensus ECR, Sensus ICE, Hersey Translator, or Badger ADE meter) or a pulse register (e.g., as found in a Badger RTR meter). Details regarding data transmission at the serial connection socket 1146 are provided in connection with FIG. 17, below.

The testing socket 1148, functions similarly to the second connection 1018. The testing socket 1148 remains unconnected to any other devices, but instead, remains as an alternate connector for any debugging, repairs, maintenance, improvements, future programming, or the like that may occur. In other embodiments, the testing socket 1148 may function similarly to the serial connection socket 1146, or connect to any other devices that may be added to the system at installation or in the future. In still other embodiments, the testing socket 1148 can be replaced by a wireless testing interface.

Similarly, the expansion board slot 1149 is configured for general purpose I/O and includes generic pins for connection to an expansion board (e.g., board 1110) for any of a variety of additional functions such as those described above. The expansion board slot 1149 adds to the convenience of the device 1000 by saving any future effort in adding additional circuitry to the circuit board 1140. In some embodiments, however, the expansion board slot 1149 may be utilized prior to installation if there is any added functionality at a time prior to installation but after manufacturing. In other embodiments, the expansion board slot 1149 may be utilized as an aid to the main board 1144. In the current example, the expansion board slot 1149 also connects to the ground.

Figure 17:
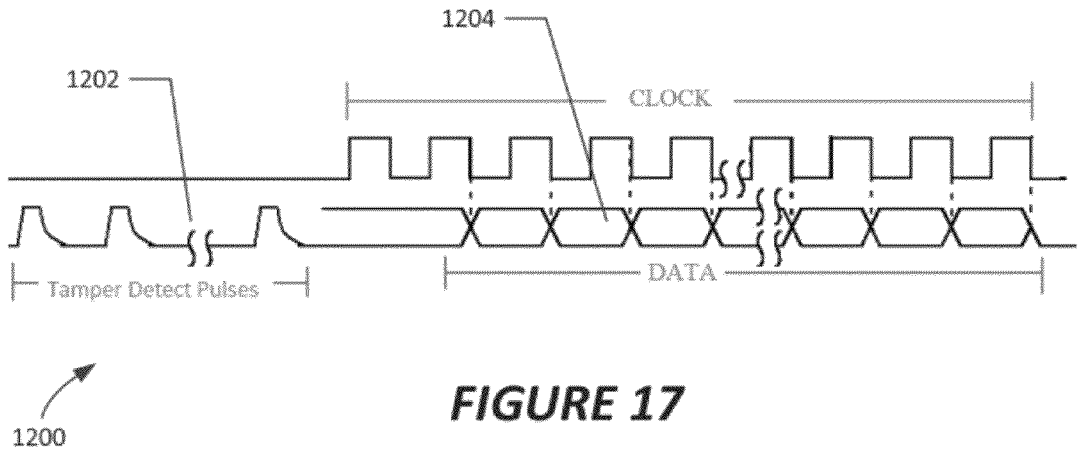
FIG. 17 is a timing diagram illustrating interrogation of a water meter at a water meter interface, according to an example embodiment.

In the example shown in FIG. 17, a serial interface includes three wires, a data wire, a clock wire, and a ground wire. In the timing diagram 1200 shown, the data wire is used to interrogate the meter and to receive a reading from the meter.

As the interrogating device toggles the clock, the meter sends data on the data wire. The data from the meter consists of 1 start bit, 7 data bits, 1 parity bit, and 1 stop bit. The simple substitution code detailed in Table 1 is used to decrypt the numeric data.

TABLE 1

| Decoded Data | Encoded Hex | Encoded Decimal |
| --- | --- | --- |
| 0 | 79 | 121 |
| 1 | 39 | 57 |
| 2 | 59 | 89 |
| 3 | 19 | 25 |
| 4 | 69 | 105 |
| 5 | 29 | 41 |
| 6 | 49 | 73 |
| 7 | 9 | 9 |
| 8 | 71 | 113 |
| 9 | 31 | 49 |

A responsive data signal 1204 is received from the meter and captured by the main board 1144. When interrogated, these meters respond with the absolute meter reading and an eight digit ID number. The overall data frame is detailed in Table 2. Note that data fields may vary in length depending on manufacturer and model.

TABLE 2

|  | Decimal | Hex | Char |
| --- | --- | --- | --- |
| Frame Start Token | 74 | 4A | J |
| End of Field Token | 17 | 11 | DC1 |
| Register Value Token | 90 | 5A | Z |
| Data Start Token | 94 | 5E | ^ |
| Register Reading | Variable Length | | |
| End of Field Token | 17 | 11 | DC1 |
| Customer ID Token | 54 | 36 | 6 |
| Data Start Token | 94 | 5E | ^ |
| Customer ID Number | Variable Length | | |
| End of Frame Token | 39 | 27 | ' |

In alternative embodiments of the device 1100, other types of meter interfaces could be used in addition to or in replacement to the serial interface described above. For example, the interface to a meter could include a radio link interface, an optical link interface, or a contact closure or pulse interface. In some embodiments, a radio link interface or optical link interface could be established by addition of a complementary radio or optical module as an add-on component to a standard resource meter. In such embodiments, the device 1100 could connect to two or more meters, or types of meters.

Figure 18:
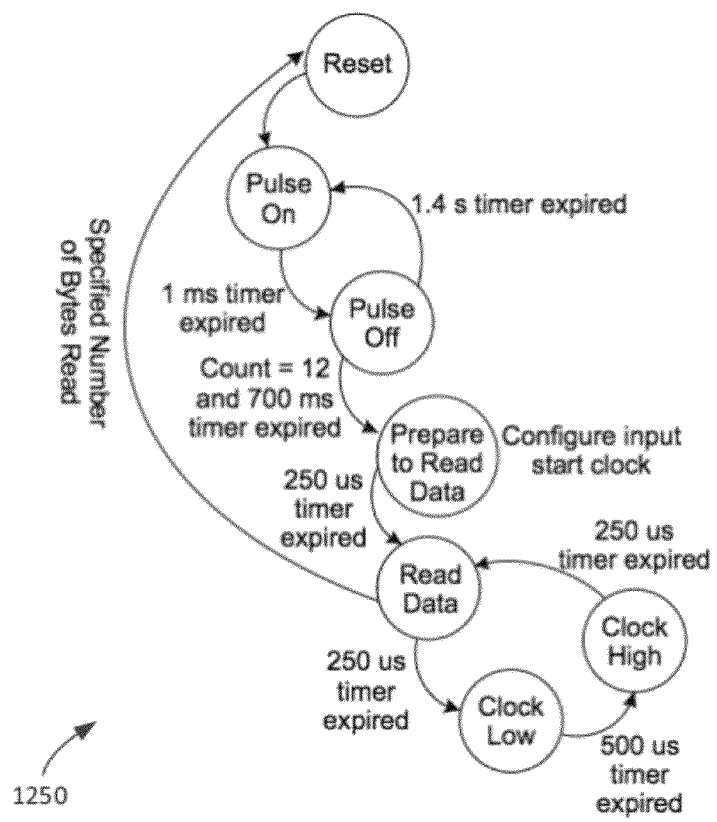
FIG. 18 is an example state diagram useable in the water meter reading device to interrogate a water meter at a water meter interface, according to an example embodiment.

FIG. 18, an example state diagram 1250 is illustrated which implements interrogation of meters from the main board 1144, and which reflects the above interrogation.

Referring back to FIG. 16, the main board 1144 translates the received serial data into a data packet transmittable via satellite communication and recognizable to an end-device. Accordingly, the main board 1144 translates the various formats of serial data into a standard protocol recognizable at a utility resource management computing system 22 as shown in FIG. 1. For example, in an example embodiment, a data packet can be translated to a 22-character hexadecimal data packet that can include a hex value representing current battery voltage, two values representing error codes (e.g., lack of communication or completion of communication) two values representing a message type (e.g., a poll message, user data, or a terminal message), eight values representing a meter reading in hexadecimal format, eight more values representing an identifier of the meter from which the reading is received, and an optional placeholder/parity bit. The same length data packet can be used in other circumstances to communicate the status of a device, such as an amount of failed traffic from that device, its current operating temperature, battery voltage, operational mode (install vs. normal), and slot time (i.e., time required to communicate with a satellite, typically either 2.5 or 10 seconds depending upon connection quality). Other messages, such as to communicate a current firmware version in the device, could be used as well.

Figure 19:
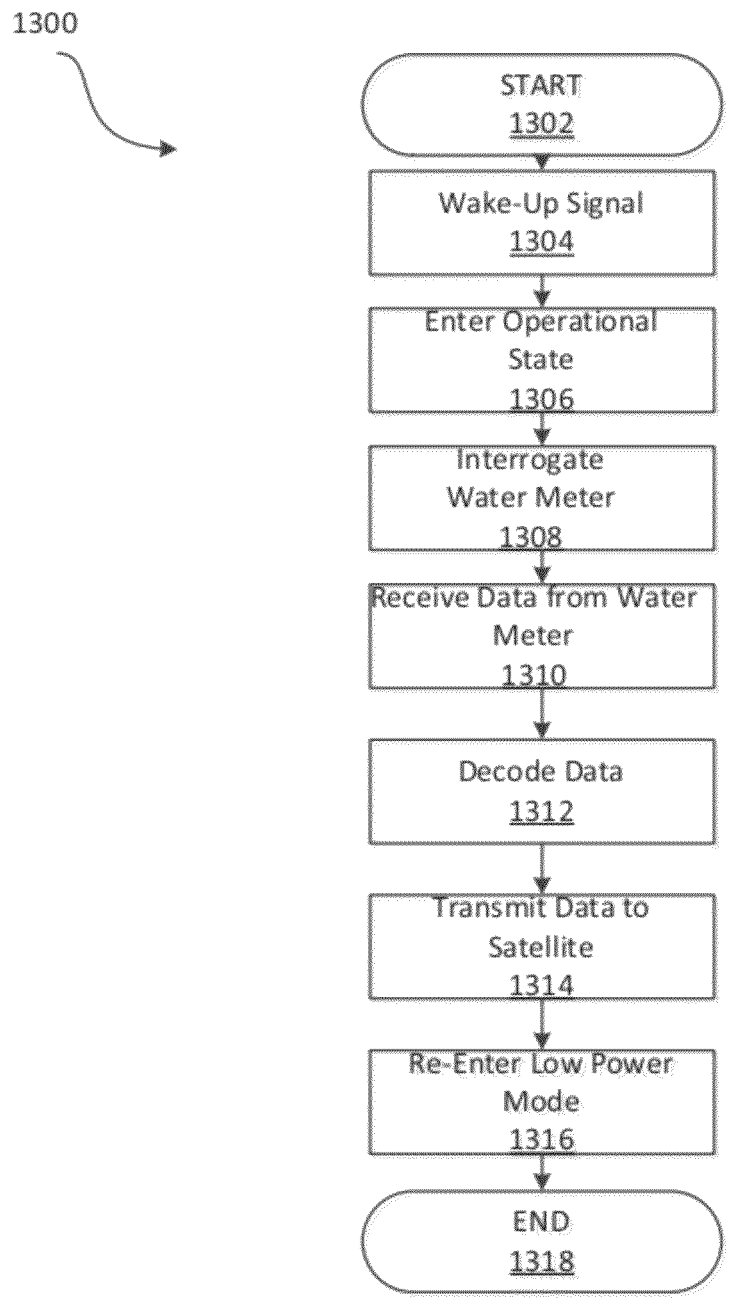
FIG. 19 is a flow chart of an example method of operation of a water meter reading device according to a possible embodiment of the present disclosure.

Now referring to FIG. 19, a flow chart of one embodiment of a method of operation 1300 of a water meter reading device is shown. The method 1300 is one example of the operational steps of the devices 1000, 1050, 1100 and will be described below utilizing the components of the devices 1000, 1050, 1100 (referring to device 1000 as shorthand for all such devices). However, it is understood that various other methods of operation exist for the devices.

In the embodiment shown, the method is instantiated at a start operation 1302, which corresponds to an initial assembly and installation of a device, such as water meter reading device 1000, at a location coupled to a utility resource utilization meter within the system 10.

A wake-up operation 1304 corresponds to triggering a wake-up of the device, for example based on a low power clock maintained within the device. Alternatively, the wake-up operation 1304 could correspond to receiving a signal from a remote location, such as a satellite. Upon wake-up, the device 1000 enters an operational state step 1306. The device 1000 is likely to be in a sleep mode or a wait mode prior to entering an operational state at step 1306.

An interrogation operation 1308 begins interrogating the water meter to receive data packets indicative of a reading. The interrogating can occur in various ways, such as, for example, by pulse interrogation. For example, a series of a certain number of pulses is sent to the meter. In some embodiments, twelve pulses, each having a width of 1 millisecond and period of 1.4 seconds, are sent to the water meter. The interrogating circuitry switches on an input line of the water meter, thereby allowing the meter to send data packets indicative of a reading on the input wire. Upon transmittal from the water meter, the device 1000 enters a receive data operation 1310, which simply accepts the data packets from the meter.

After receiving the data packets, the device 1000 enters a decode data operation 1312. Generally, the data packets, which can be encoded in a variety of ways depending on the type of water meter or device which transmitted the data, must be translated into a standardized format compatible with the device and overall system. The microcontroller 1020 handles the translation of the data packets, as described above.

Once translated, the standardized data packets are sent to a remote location by a transmit data operation 1314. The operation utilizes the antenna 1022 to transmit signals to a satellite or some other receiver in a remote location for further processing. The transmit data operation 1314 can also transmit other data associated with the device, such as health status information regarding the device, as discussed above in connection with the various available hexadecimal coded messages used for transmission to a remote system.

Upon transmitting the data, the device 1000 enters a low power mode operation 1316. The low power mode may be any low power state such as a sleep or wait mode. An end operation 1318 corresponds to completed water meter reading retrieval and transmittal.

Referring to FIG. 19 generally, it is recognized that the general method 1300 described in connection with this figure is typically performed and completed daily, and represents a relatively short period within the day. For example, the device 1000 can be configured to wake-up, obtain and transmit data, and return to a low power mode within approximately 30 seconds. Due to the relatively short period of time the device is active each day, it is recognized that using a substantially high-capacity battery will allow the device 1000 to operate for many years (estimated to last about 10 years under normal operation) without requiring maintenance.

C. Data Storage and Device Installation

Referring now to FIGS. 20-34 generally, additional details regarding data managed at a utility resource management computing system 22 and stored in a utility resource usage database 24 are provided, as represented both within a database and as reflected in user interfaces generated by a web application provided through a web server (e.g., web server 26).

Figure 20:
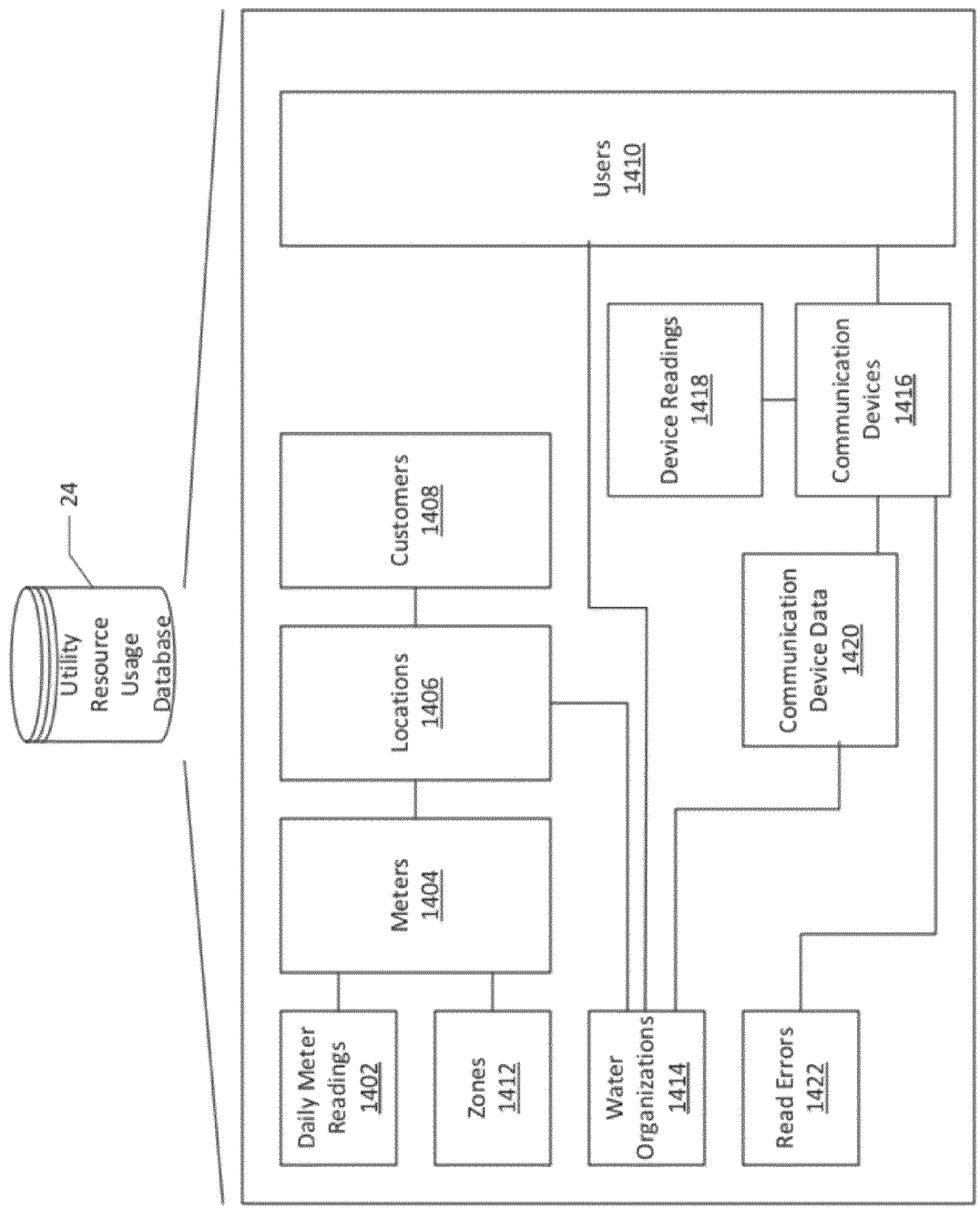
FIG. 20 is a logical block diagram illustrating a data layout of a utility resource usage database, according to an example embodiment of the present disclosure.

FIG. 20 illustrates details regarding logical arrangement and content of a utility resource database 24, according to an example embodiment. In the example shown, the utility resource database 24 includes a set of tables maintaining data associated with a number of resource providers and associated resource users, as well as the meters and communications devices associated with those entities. In the embodiment shown, the database 24 includes a meter readings table 1402, a meters table 1404, a locations table 1406, and a customers table 1408. The meter readings table 1402 includes data associated with a meter reading, including the ID of the meter, the reading date, the reading, and associated information. The meters table 1404 is configured to track each meter included in the overall system, and therefore includes an ID of each meter, as well as an associated location ID (e.g., the associated business or billing address), as well as an identifier of the customer (e.g., resource provider), an indication of the model number or type of meter, whether the meter is billable, and various alerts. The locations table 1406 includes a location identifier and an associated customer identifier, organization identifier, associated billing address and GPS locations associated with the location identifier, any alternate addresses, and other information. The customers table 1408 includes a customer identifier, organization identifier, account number of the customer, contact names and business address information. In various embodiments discussed herein, the customer corresponds to an individual or entity that enrolls with a service for tracking water usage, such as a resource provider.

In the embodiment shown, the database 24 additionally includes a users table 1410, as well as a zones table 1412 and an organizations table 1414. The users table 1410 stores information about various types of individual users to allow those users to access data in the database via a web application. The users table 1410 can therefore include information such as the user ID, organization ID, name, title, contact information, password information, and security question information. The zones table 1412 stores information such as the zone identifier, description, and other information about the zone being monitored. The organizations table 1414 stores information about each particular organization, such as a water district or other utility resource provider, which uses the database 24. Example data in the organizations table 1414 includes the organization ID, logo, alert levels, billing day information, and zone identifiers.

In addition to the above, a number of tables relating to the device itself are included, such as a devices table 1416, a device readings table 1418, a device data table 1420, and a read errors table 1422. Other tables could be included, and other types of data could be included in the database 24 as well. The devices table 1416 stores information about a device installation, such as its location and orientation, its identity, who installed that device, its height and last updated software date. The device readings table 1418 stores timestamp-meter reading combinations, such as might be received periodically from a device via a satellite communications network in the hexadecimal messaging format described above. Likewise, the device data table 1420 stores information about operational status of a device, such as might be received in an alternative type of hexadecimal message from the device; example types of data include the firmware version, battery voltage level, signal to noise ratio experienced by the device, temperature, number of connection attempts to a satellite, and other information. The read errors table 1422 stores error types, associated devices, times the error occurred, and the value associated with each error.

Although the above data fields are discussed, it is recognized that more or fewer data fields could be implemented in alternative embodiments. As such, the data fields in database 24 are intended as exemplary, rather than limiting.

Figure 21:
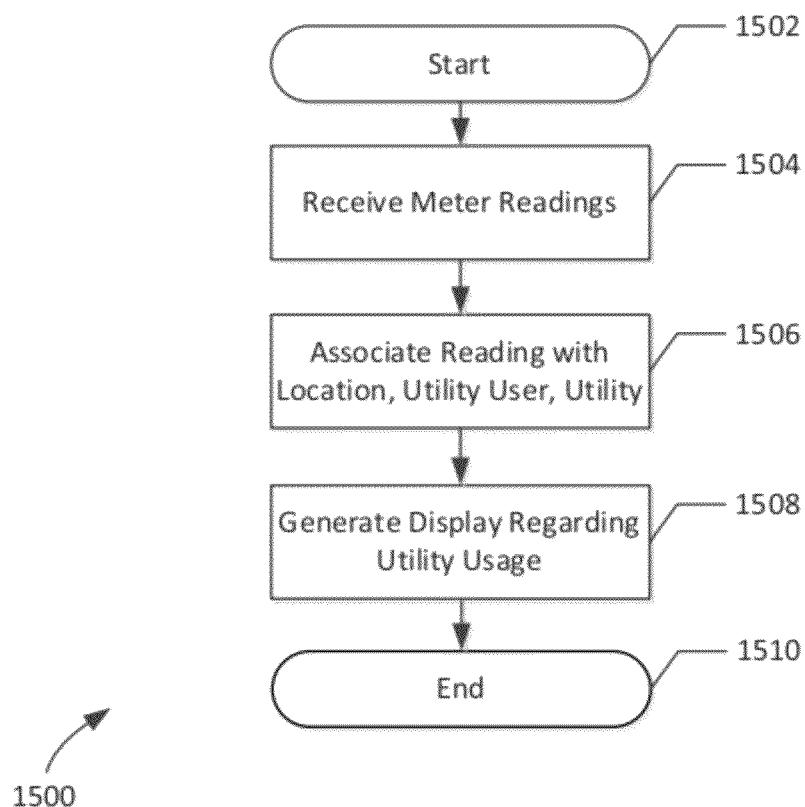
FIG. 21 is a flowchart of a method of managing received utility resource usage information in a utility resource usage database, according to an example embodiment.

Referring now to FIG. 21, a method 1500 of managing data in a utility resource usage database of a utility resource management computing system 22 is provided. The method 1500 is instantiated at a start operation 1502, which corresponds to deployment of one or more utility resource usage capture components for monitoring utility usage. The method 1500 further includes receiving one or more meter readings from one or more utility resource usage capture components, such as devices 1000, 1050, 1100, described above (step 1504). When the reading is received at the utility resource management computing system 22, the reading is stored in association with the corresponding location from which it is received, as well as an identity of a utility user and a utility with which it is associated (via database links) (step 1506). After the reading is stored, it is available to be reflected in one or more displayed user interfaces provided based on the data in the database, for example in a web application generated by a web server (e.g., web server 26) (step 1508). An end operation 1510 terminates the method.

Referring now to FIGS. 22-34, a utility management web application 1600 and a method of its use to install and manage one or more utility resource usage capture components is illustrated, according to an example embodiment of the present disclosure. The utility management web application 1600 can be used to manage both deployments of utility resource usage capture components and analysis of data received from those same components/devices.

Figure 22:
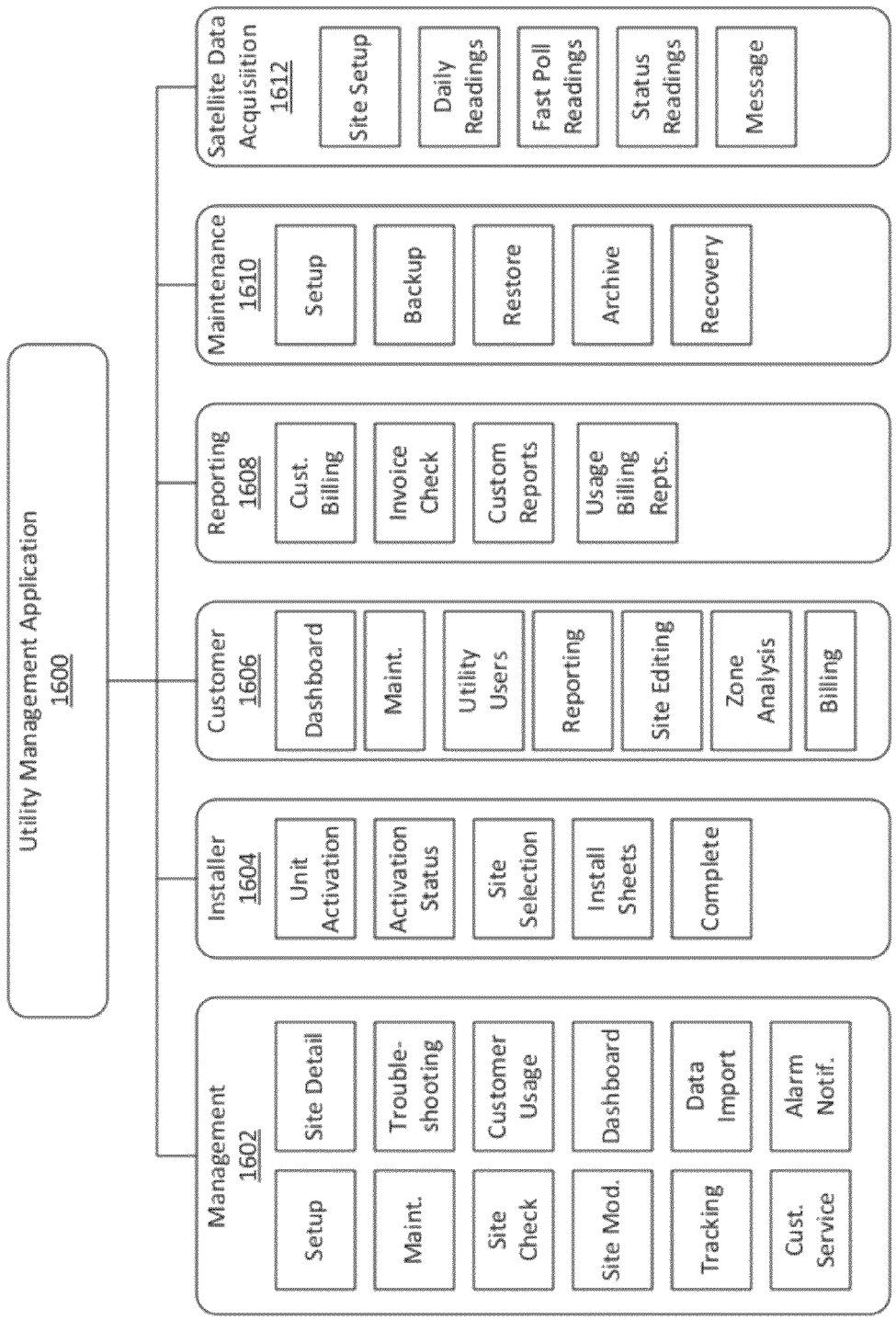
FIG. 22 is a logical block diagram of a utility management application capable of interfacing with a utility resource usage database, according to an example embodiment.

FIG. 22 illustrates a logical block diagram of the utility management web application 1600. The application 1600 includes a plurality of submodules based on types of operations performed and users allowed to access that data and/or functionality, including a management module 1602, an installer module 1604, a customer module 1606, a reporting module 1608, a maintenance module 1610, and a satellite data acquisition module 1612.

The management module 1602 allows a user to manage a variety of functions within the system, including adding or editing information about various sites, checking an operational status of various sites, monitoring customer usage, importing data, as well as various setup, maintenance, data import, or alarm setup or customer service tasks. Generally, the management module 1602 is accessible to administrators of the web application and/or underlying database 24.

The installer module 1604 allows an installer (typically a technician granted a specified set of access rights relative to a group of utility resource usage capture components for installation and maintenance purposes. The installer module 1604 generally allows those technician users to activate one or more utility resource usage capture components, view an activation status of such components, select sites at which the components will be installed, generate installation sheets, and complete various information regarding the components. As is further described below in connection with FIGS. 23-34, installation of a component generally proceeds such that the component initially has an inactive state, but is then activated, then installed, and finally confirmed by an administrative or management user. To step through these various installation phases, a number of steps are followed by the technician users and management users, with the technician users provided access to data entry screens via the installer module 1604.

The customer module 1606 is generally intended to be provided to a utility user of the application 1600, and includes a dashboard for displaying resource usage by that utility as a whole, as well as analysis tools allowing the customer to view details relative to that resource usage (details of which are described in part D, below). Additionally, user management, maintenance, site editing, and billing features are included as well.

The reporting module 1608 generally generates reports for various types of users, such as resource users (i.e., customers of the utility) or utility users themselves. The reporting module provides access to various billing screens, custom reports, and invoice data. The maintenance module 1610 provides setup, backup, restore, archive, and recovery functionality relative to the underlying database 24, thereby allowing management users of the application 1600 to have database administrator access from a location remote from the utility resource management computing system 22.

The satellite data acquisition module 1612 manages site setup, as well as various types of communication with utility resource usage capture components. For example, the satellite data acquisition module 1612 allows for receipt of standardized (e.g., hexadecimal encoded) messages from a satellite network including daily readings as well as "fast poll" readings, which are readings that are performed on a more-than-daily basis in response to a command from the web application 1600, for example in the event a management user or customer notes an anomaly in data (e.g., which may represent a water leak or water pipe bursting, such that daily data would otherwise be insufficient). Additionally, status readings relative to each of the utility resource usage capture components are provided, obtaining information such as device temperature, voltage, firmware version, or other status information previously described. Additionally, the satellite data acquisition module 1612 allows a user to transmit a message back to a utility resource usage capture component via the satellite network, for example to interrogate the component or to initiate or stop a fast poll reading mode.

Figure 23:
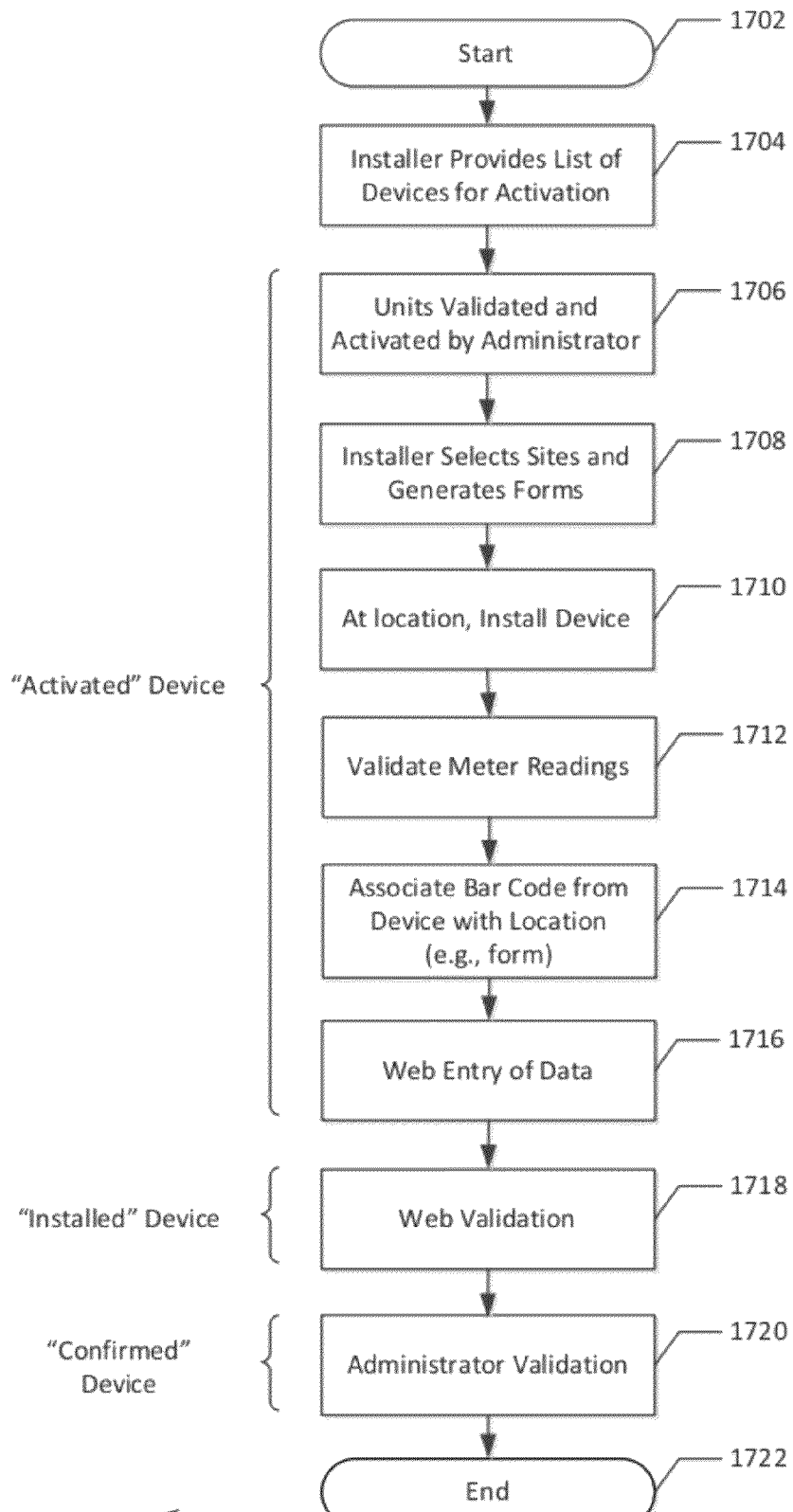
FIG. 23 is a flowchart of a method of managing utility resource capture components, according to an example embodiment.

Referring now to FIG. 23, a method 1700 is illustrated for deploying and managing utility resource capture components, according to an example embodiment of the present disclosure. The method 1700 generally represents the process through which a utility resource usage capture component is activated, installed, and validated, such that it can be used within a system such as system 10 of FIG. 1.

Figure 26:
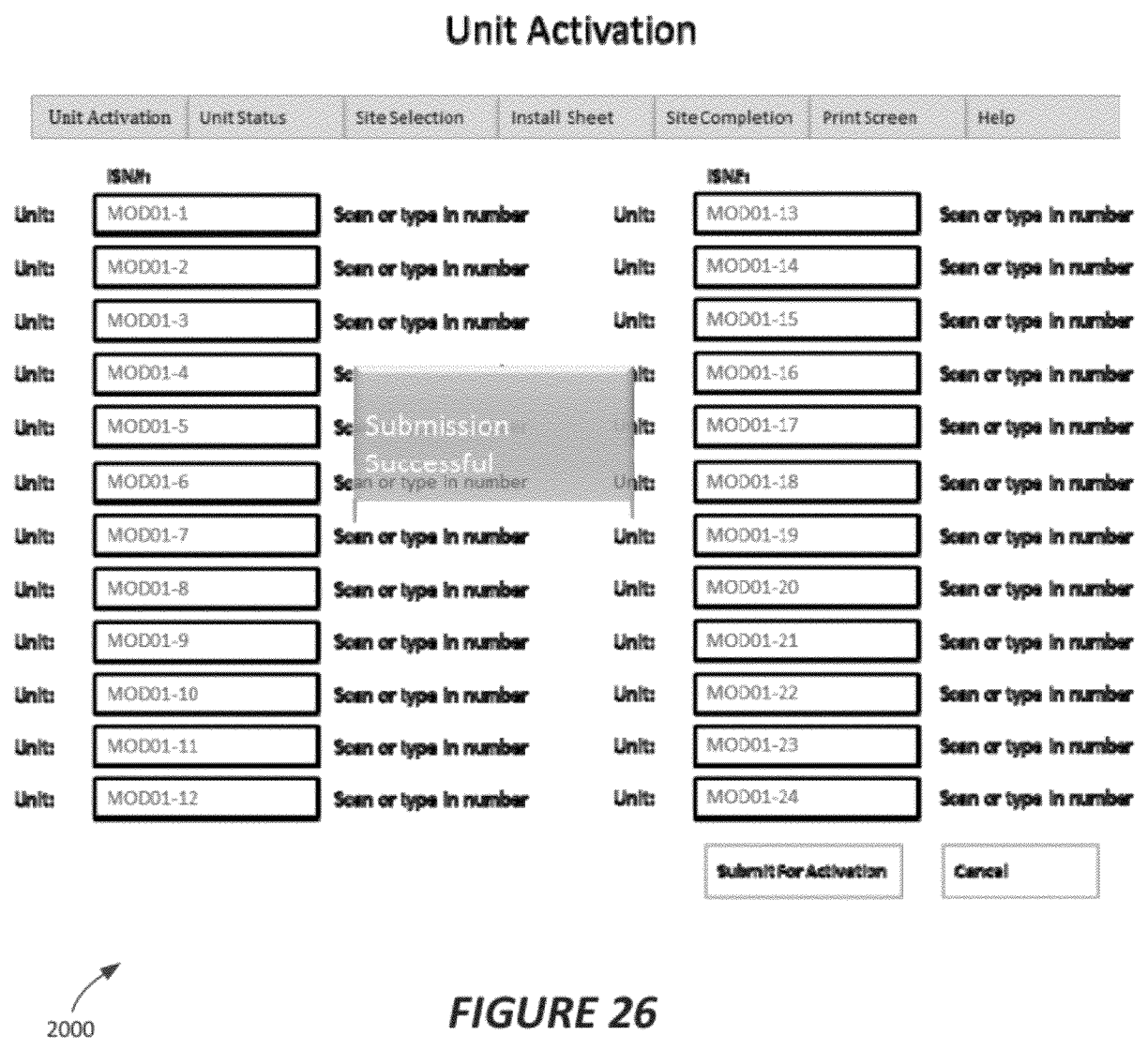

In the embodiment shown, the method 1700 is instantiated at a start operation 1702, which corresponds generally to selection of one or more utility resource usage capture components for installation. An installer then enters into the application, such as in the installer module 1604, a list of devices for activation (step 1704). This can occur, for example, by the installer scanning bar codes associated with each component to be activated, thereby entering those bar codes into a web interface (e.g., as shown in FIG. 26). An administrative user then views and activates the components identified by the installer (step 1706). At this point, the components are activated, but have not yet been installed or confirmed as active. In other words, the components can communicate with a satellite network, but are not yet considered to be gathering utility resource usage data.

Once activated, the installer will select one or more sites at which the components will be installed, and generates one or more installation sheets used to capture an association between the component and a meter to which it will be connected (step 1708). Example user interfaces viewed by the installer to perform this operation are illustrated in FIGS. 28-29. The installer then travels to the location at which the component will be installed, and installs the component (step 1710). Typically, this involves mounting the component to a rigid location such that a generally southward direction has a clear view toward a satellite, and connecting a meter interface to a meter, for example by connecting wires from a meter's serial data connection to circuitry within the component.

Once the component or components are installed, meter readings obtained from those components are validated (step 1712). This typically involves the installing technician using a tool for field-testing the component to ensure its proper operation, including validating a proper connection to both a satellite and the meter. Once operation of the component is validated, a bar code sticker on the component can be removed and placed on a printed install sheet (generated during step 1708), which includes a unique meter identifier thereon. This will, once entered into a database, uniquely associate the meter with a particular component to which it is connected. A web entry process is then performed by the installer to enter this and other data from the web form, such as the identifier of the location, the name of the installer, the initial meter read at the site, a meter reading obtained using a tool, a site GPS reading, an aim direction of the component, a type of installation of the component, a type of mount (e.g., to a post or building), and a height of the mount (e.g., for satellite connectivity troubleshooting) (step 1716). Example user interfaces used to complete entry of installation information are provided in FIGS. 30-31.

Once the field installation and data entry is performed, the component moves from "activated" status to "installed" status. The installer then performs a validation process to ensure that each of the components has been properly installed and entered (step 1718). This involves visually inspecting the readings received and stored at the database 24, to ensure that they match those provided by the installer. This allows the installer to validate that the component is installed at the correct location, has correctly connected to a satellite and is capable of transmitting data, and is otherwise operating properly. An example user interface used to validate installations is provided in FIG. 32. Generally, the technician will review the data obtained via the satellite connection to the component to ensure that the reading received via satellite and stored in the database 24 matches that obtained in the field, and that no connectivity or operational problems exist (e.g., a weak signal to noise ratio, high operating temperature, or dead or near-dead battery).

Each "installed" component is then validated by a management user as well, using a similar process to that performed by the technician (step 1720). For example, the management user can compare the data entered by the technician/installer, data included on the install sheet, and data received over the air to ensure that the correct component is at the correct location, and operating properly. Upon completion of that validation step, the component can move from the "installed" status to a "confirmed" status by the management user, indicating that the installation of that component has been properly completed and has been validated by the manager of the system 10. Operational flow terminates at an end operation 1722, which corresponds to the completed installation, such that satellite-based meter reading can occur.

Now referring to FIGS. 24-34 example user interfaces are shown which are available via a web server 26, and which can be generated from the web application 1600 of FIG. 22. Each user interface is discussed briefly below; however it is understood that any of a variety of layouts or interfaces could be used as well. As such, the user interfaces of FIGS. 24-34 are intended as exemplary rather than limiting.

FIG. 24 is an example schematic user interface 1800 for creating a new customer water utility in the application. The user interface 1800 is generally used by a management user (e.g., a user of the management module 1602 of the web application 1600) to create or modify details regarding a new customer as a utility resource provider (in this case, a water utility). Details regarding preferences of that customer are entered in the user interface 1800, such as the name, address, contact information, billing days, and alert thresholds can be provided.

Figure 25:
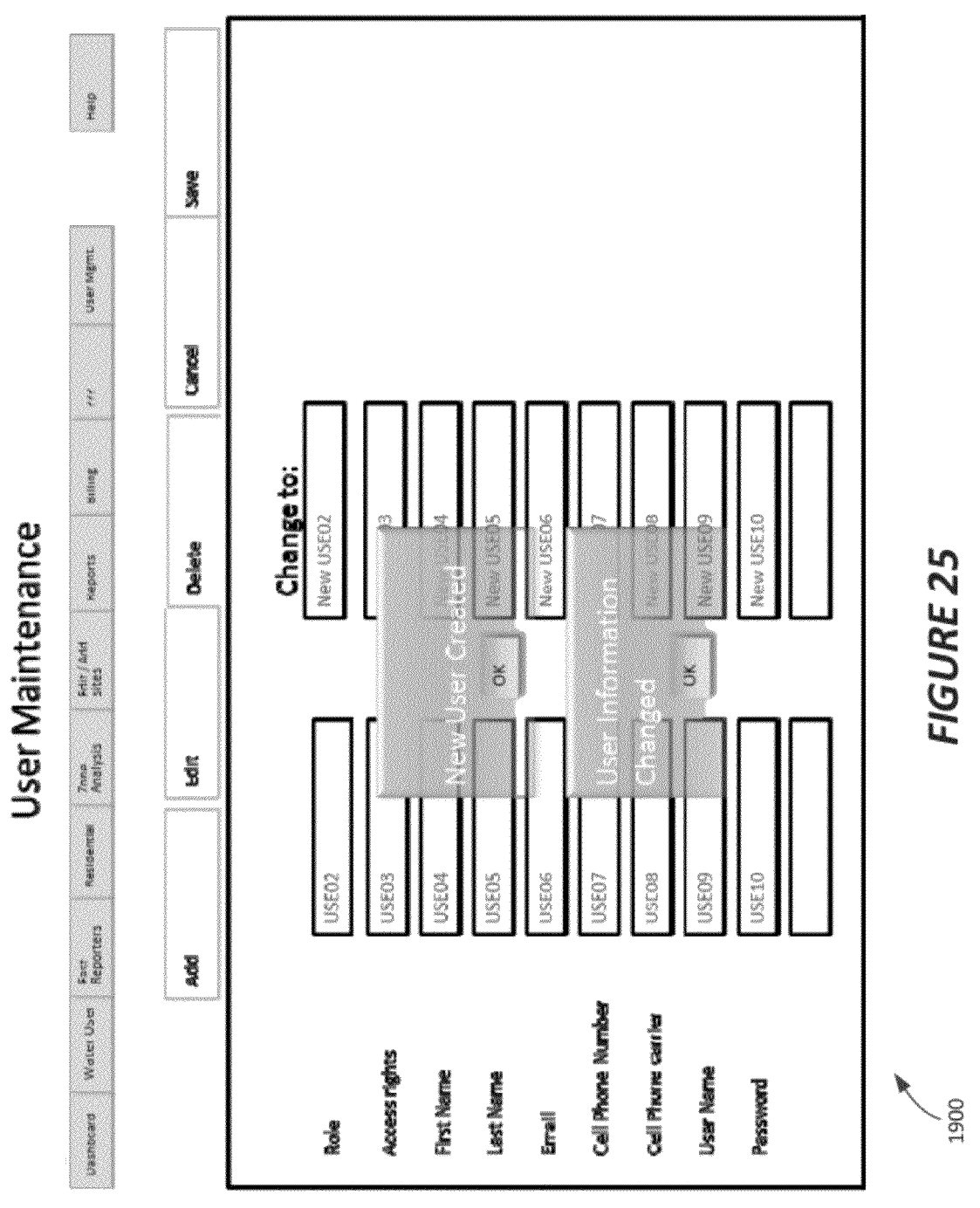

FIG. 25 is an example schematic user interface 1900 for maintaining users within the application. The user interface 1900 is generally used by either a management user or a customer (utility resource provider) to control access to data, for example by defining a user and his or her role (e.g., management, administrative, installer, resource consumer, etc.) The user interface 1900 allows entry of user details as well as password information required for accessing information in the database 24, such as meter readings relating to one or more meters or customers.

FIG. 26 is an example schematic user interface 2000 for activating one or more utility resource usage capture components. As discussed above in connection with FIG. 23, the user interface 2000 is configured to receive one or more bar codes of utility resource usage capture components/devices, for installation. Upon selection of the "submit for activation" button, the selected components can initiate communication via satellite.

FIG. 27 is an example schematic user interface 2100 for displaying activation status of one or more utility resource usage capture components. As illustrated, various units can be tracked which have either had activation requested but not yet executed (i.e., after step 1704), or for which activation has been performed (i.e., after step 1706). FIG. 28 depicts a user interface 2200 for selecting one or more locations to be associated with a particular utility resource usage capture component. This user interface can be used in connection with step 1708 of FIG. 23, discussed above.

FIG. 29 is an example schematic user interface 2300 for generating installation sheets for use by an installer to complete installation of one or more utility resource usage capture components. The user interface 2300 includes a listing of selected utility resource usage capture components, and upon selection of a "Print Install Sheets" option 2302, will generate partially populated install sheets with an address and a meter identifier, such that the associated utility resource usage capture component can be associated with the meter on the sheet. This user interface can also be used in connection with step 1708 of FIG. 23, discussed above.

FIGS. 30-31 represent user interfaces 2400-2500 used for web-entry of installation details regarding one or more utility resource usage capture components, for example to capture specific information regarding the manner of installation, including the specific GPS reading at the installation location, an initial meter read, a meter read obtained using a diagnostic tool, the installer's name, the direction of aim of the utility resource usage capture component, type of installation, type of mount of the component, and height of component installation. Other information could be entered as well; however it is noted that the information previously selected (address and unit identifier) are pre-populated. These user interfaces can be used in connection with step 1716 of FIG. 23, discussed above.

Figure 32:
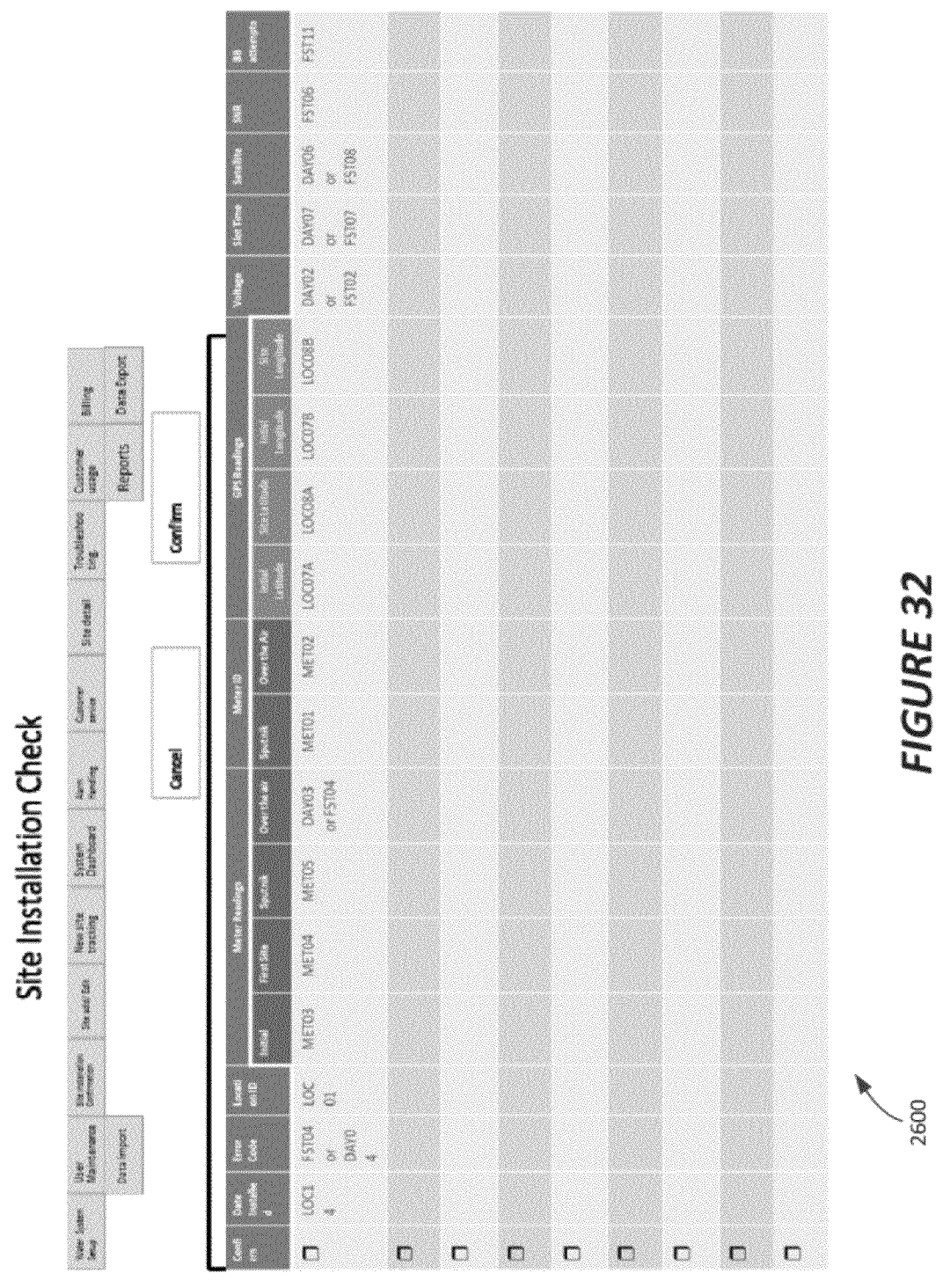

FIG. 32 is an example schematic user interface 2600 for validating an installation of a utility resource usage capture component at a particular site or location. This user interface can be used in connection with one or both of steps 1718, 1720 of FIG. 23, discussed above.

FIGS. 33-34 are example user interfaces 2700-2800 for modifying and viewing details regarding a location of one or more utility resource usage capture components associated with a particular billed resource user, or details regarding a particular billed customer location. As seen in user interface 2700, a variety of data can be captured and tracked, such as the mailing address of the site, GPS location of the site, alert thresholds, meter reads, meter model number, account contact information, and other information. As seen in user interface 2800, operational status of a component at the particular location can be viewed.

D. Reporting Systems

Once utility resource usage capture components are installed and operational, it is generally valuable to monitor usage of a utility resource, to determine how the particular resource has been used, and whether any problems are being experienced by resource users. Referring now to FIGS. 35-39, various dashboards and analysis tools are provided by the web application 1600, for example in the reporting module 1608, for analyzing resource usage. Again, although discussed herein with reference to water usage data, it is recognized that the reporting features discussed herein could have a variety of additional applications.

Figure 35:
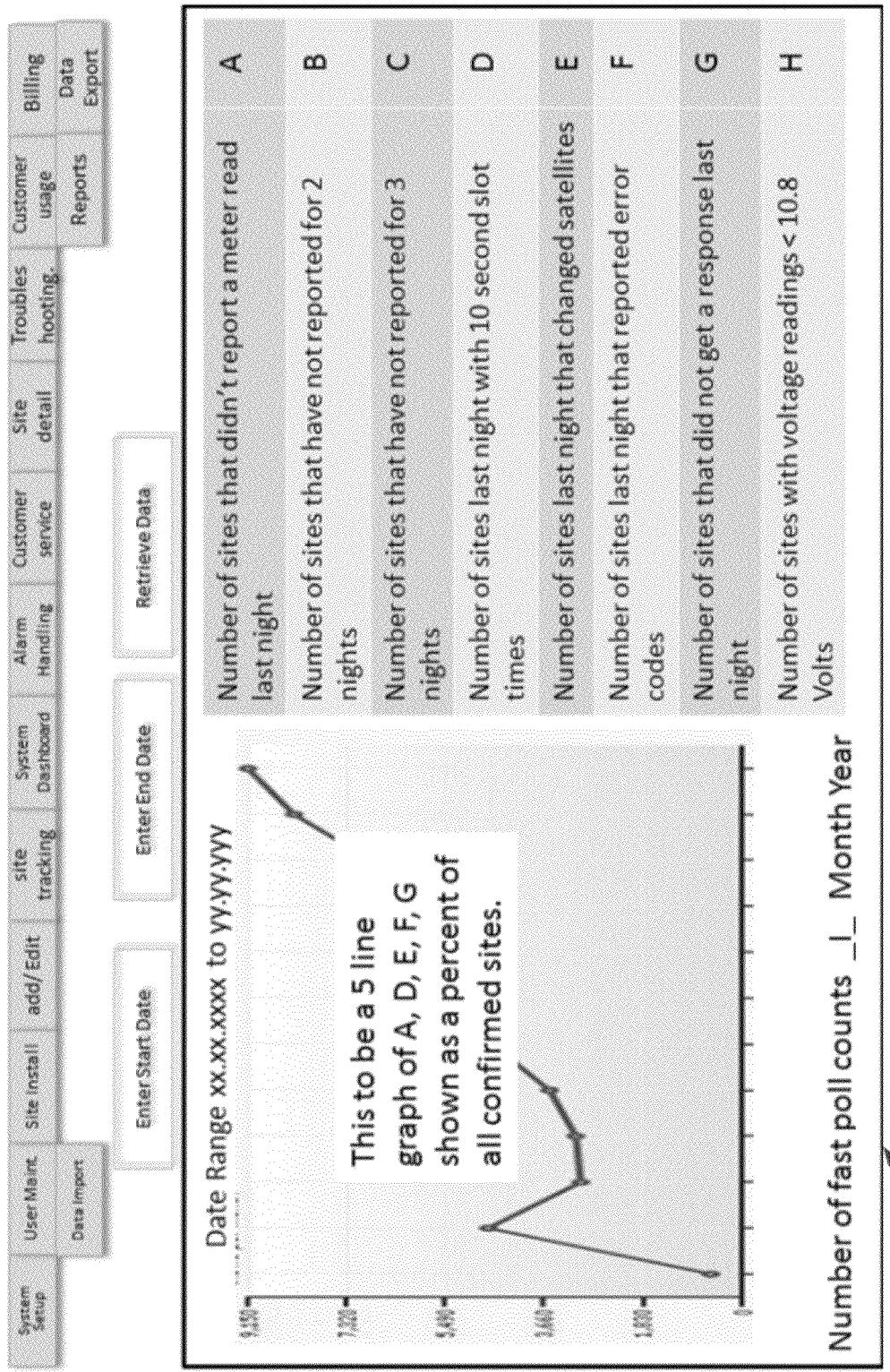
FIG. 35 is an example schematic user interface of a web application for a utility management application providing an administrative dashboard, according to an example embodiment.

Referring specifically to FIG. 35, an example user interface 2900 is shown that provides an administrative dashboard, according to an example embodiment. The administrative dashboard is generally configured to provide a summary of issues relevant to a management user for a selected period of time, for example relating to system malfunctions or percentage success rate in obtaining data from utility resource usage capture components. In the context of the present disclosure, a management user generally refers to a user responsible for managing the overall system 10, rather than a particular utility provider or other possible customer using the system.

In the example shown, various types of errors or operational issues are summarized, such as a number of sites having a utility resource usage capture component and for which no reading was received, a number of sites for which readings have not been received for two or more nights, or a number of sites that have not reported for three or more nights. Additional issues, such as a number of sites using a 10 second slot for satellite communications or which switched satellites for communication (indicating issues with satellite connectivity) could be summarized as well. Other issues relevant to system malfunctions, such as error codes or low/dead battery levels can be summarized as well.

Figure 36:
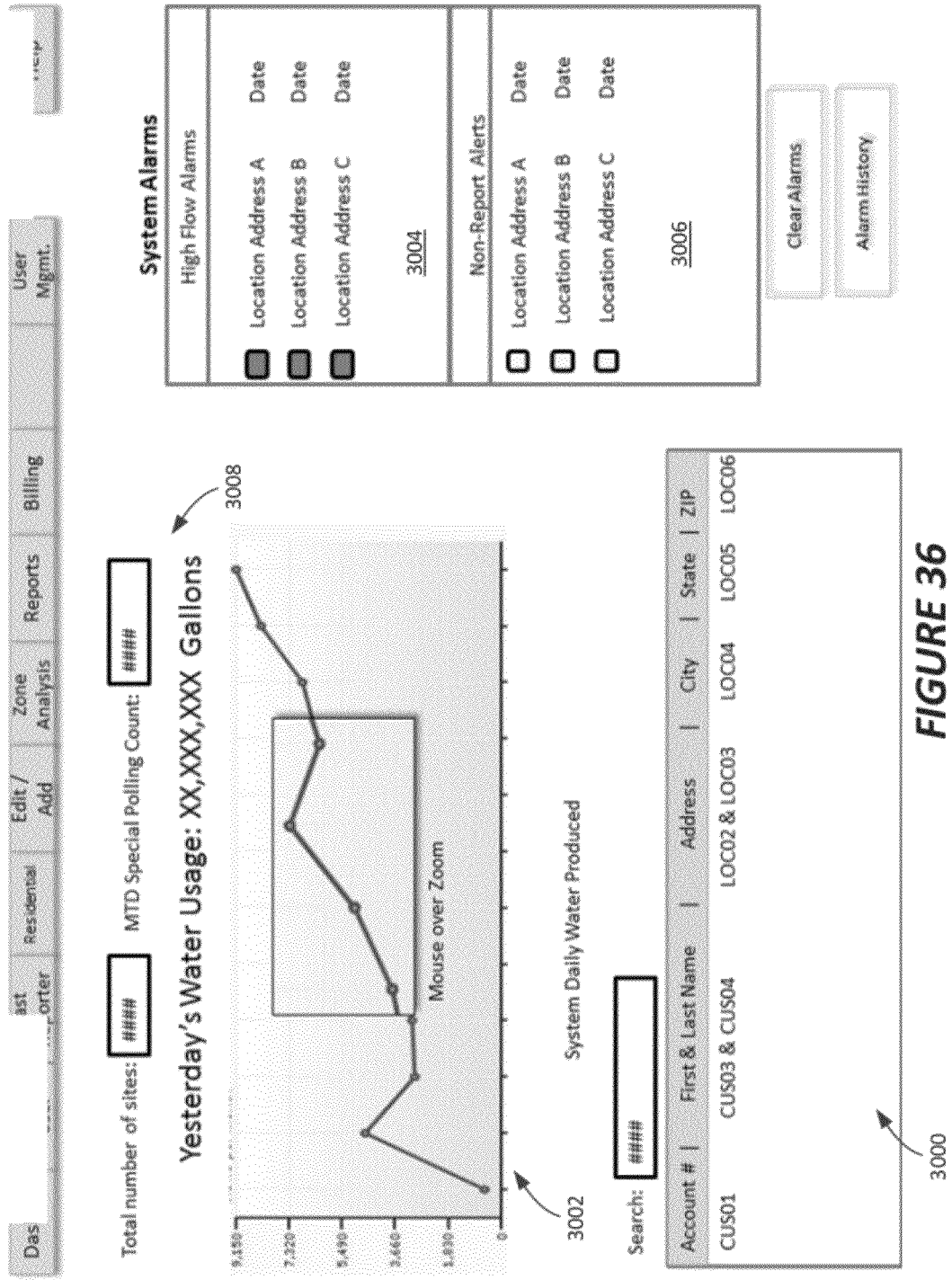
FIG. 36 is an example schematic user interface of a web application for a utility management application providing a water utility dashboard, according to an example embodiment.

FIG. 36 illustrates a user interface 3000 providing a dashboard relevant to a water utility, according to an example embodiment. The user interface 3000 includes a total water usage among all billed water meters, for example based on an aggregate amount reported from utility resource usage capture components. A chart 3002 comparing that day to previous days could be provided, as well as a summary of possible resource usage issues, such as a high flow alarm 3004 at a particular utility resource usage capture component (indicating the possibility of a burst pipe or other issue) as well as a non-report summary 3006 (indicating the number and identity of utility resource usage capture components that have not reported and which are affiliated with the particular water utility). In addition, a summary 3008 of a number of sites operating using a special "fast polling" mode is provided, indicating a number of sites under close observation due to abnormalities detected by the system (e.g., X % above typical usage indicating a possible error).

Figure 37:
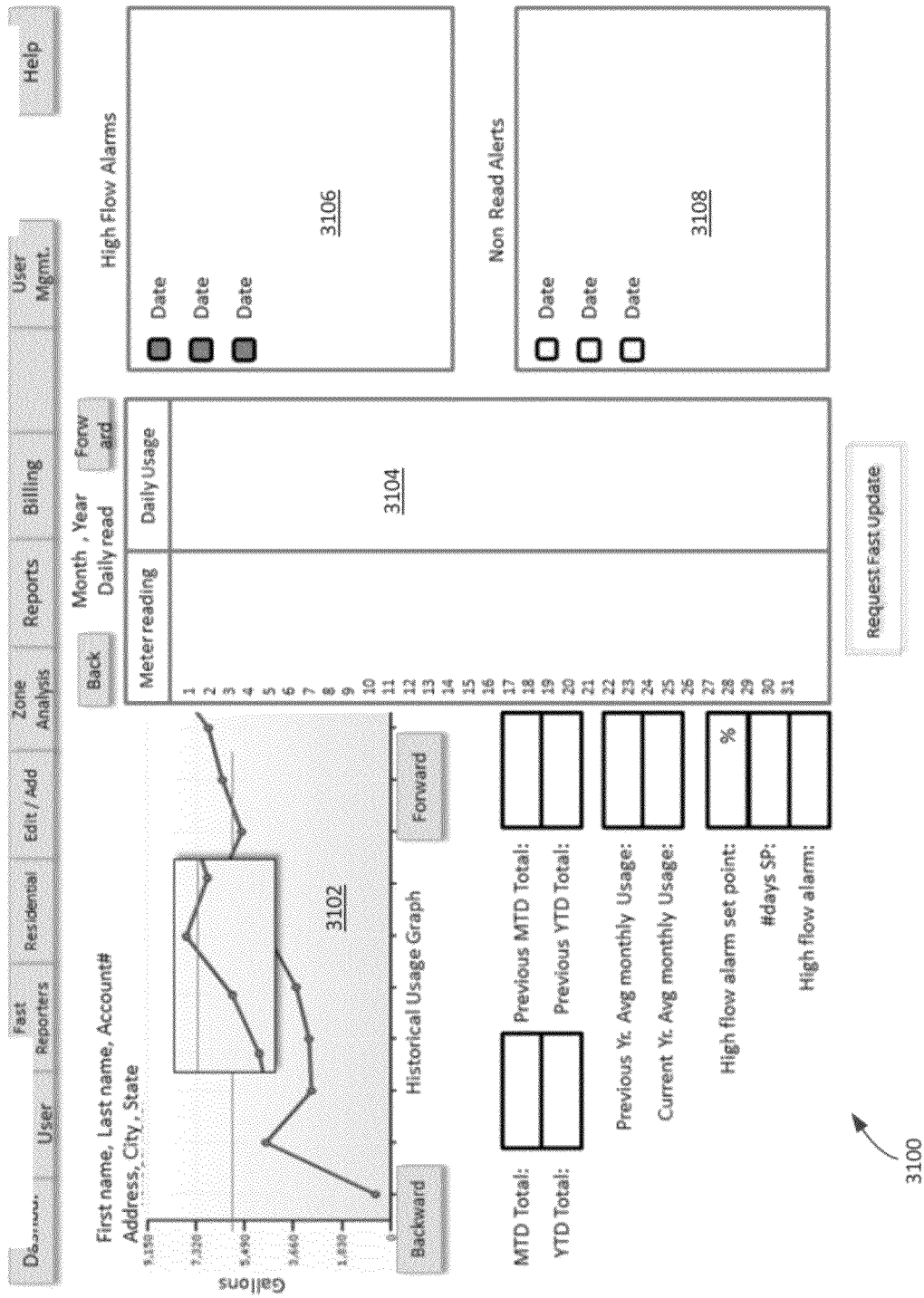
FIG. 37 is an example schematic user interface of a web application for a utility management application providing a water user dashboard, according to an example embodiment.

FIG. 37 illustrates a user interface 3100 providing a dashboard relevant to a water user, according to an example embodiment. The user interface 3100 includes a historical usage chart 3102 for that user over a past x number of days, as well as total water usage over a previous period, such as a month, and year over year totals and comparisons for a particular water user and associated site (i.e., a site associated with a water user, representing readings received from a meter associated with that user). A daily reading column 3104 allows the user to view each daily reading from his/her meters. An alarms area including a high flow alarm field 3106 and a non-read alert field 3108 allow the user to personally view when a utility resource usage capture component associated with his/her water meter is non-functional, or if a high flow event requires investigation.

Figure 38:
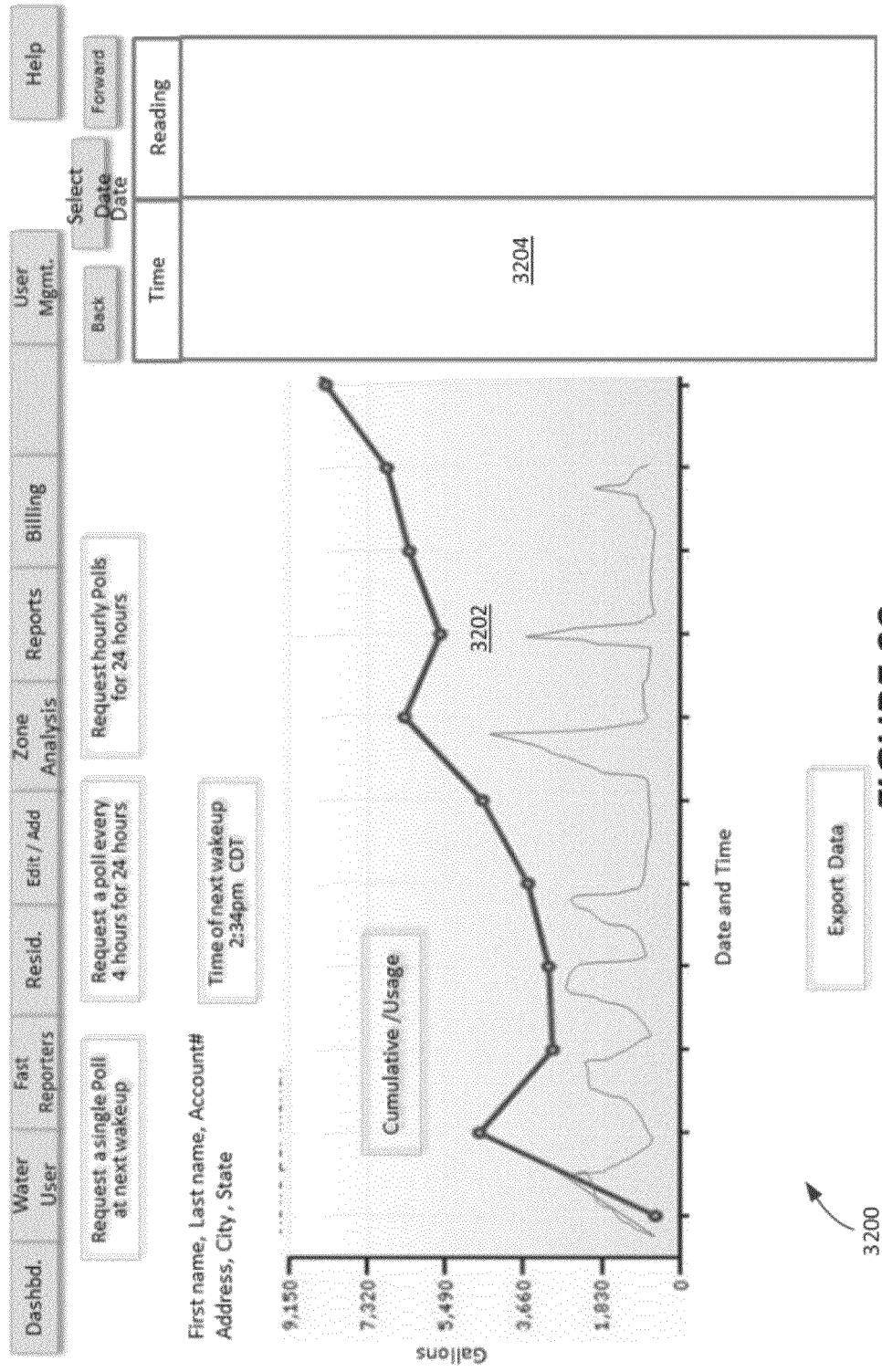
FIG. 38 is an example schematic user interface of a web application for a utility management application providing a water utility dashboard in the event of a fast reporting process, according to an example embodiment.

FIG. 38 illustrates a user interface 3200 providing a dashboard relevant representing a fast reporting action, according to an example embodiment. As mentioned above, fast reporting is a process which may occur upon detection of an error or anomaly at a particular utility resource usage capture component, such as a high flow event. A fast reporting action can include, for example, hourly reporting, rather than daily reporting of meter readings, to allow a user (e.g., a resource user, a resource provider, or a management user) to detect whether an error may exist, or whether the anomaly is attributable to use at a particular time of day. The user interface 3200 includes a chart 3202 showing water usage over a predetermined period by date and time, as well as a table 3204 of readings occurring during the fast reporting process.

Figure 39:
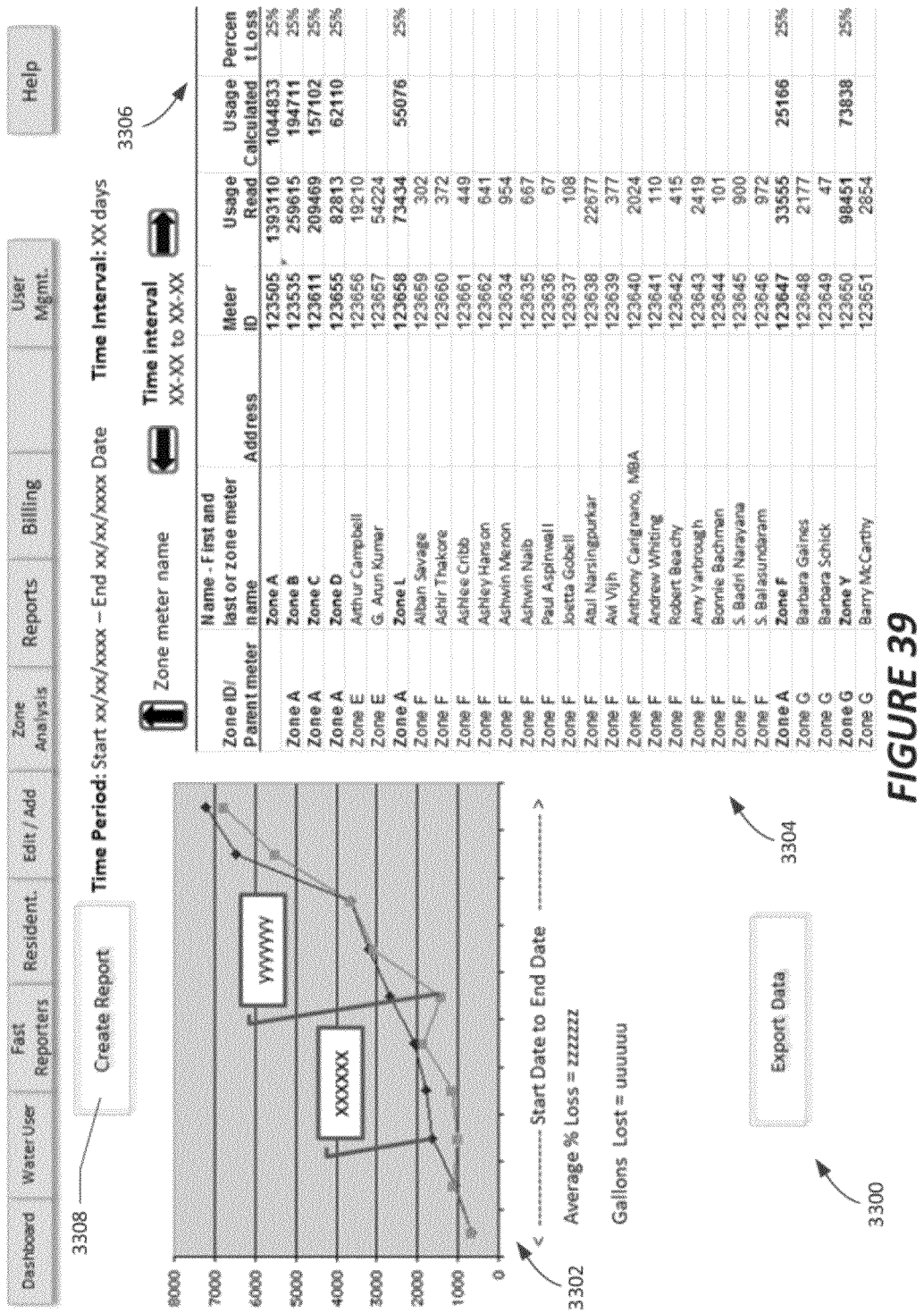
FIG. 39 is an example schematic user interface illustrating zone analysis metrics available via a web application for a utility management application.

FIG. 39 illustrates a user interface 3300 illustrating zone analysis metrics available via a web application, according to an example embodiment. In the embodiment shown, the user interface 3300 allows a user (typically a management user or a resource provider, such as a water district) to select a time period and create a report indicating average usage at various zones of a water district, such as district 200 of FIG. 2. In the embodiment shown, a chart area 3302 compares water usage at billed meters to water flow through a line meter to determine a discrepancy between the two, for example due to an unregulated tap, burst pipe, or other loss (e.g., leakage). A table 3304 illustrates a name of a billed user or zone, as well as a meter identifier and a meter reading indicating water usage or flow through that location. A calculated usage column in the table 3304 allows the user to view usage at a zone versus usage at a particular billed location. In particular, a loss column 3306 in the table 3304 calculates the difference between the aggregated billed water meters and flow through a line meter, to determine the unbilled, uncaptured water loss of the zone of the water district. Additionally, a report generation option 3308 allows a user to generate a report document representing the data as viewed in the zone analysis interface 3300.

Referring now to FIGS. 1-39 generally, it can be seen that the methods and systems provided herein, in particular when used in connection with a utility resource usage capture component providing low-power automated satellite communication of meter readings for aggregation and analysis, provide a number of advantages. For example, the systems of the present disclosure can be distributed over a wide geographical area with limited, if any, effect on ease of data capture and monitoring.

For effective water usage monitoring and management, it is generally important to provide three aspects of a system. First, it is important to provide a system in which all assets or features are accessible via the system. The methods and systems of the present disclosure provide for this by ensuring that even assets or resources that are widely geographically dispersed can be accessible to a water management system. Second, it is important to aggregate those readings for review at a centralized location. Using the satellite-based system described here, aggregation is made possible regardless of otherwise-present challenges regarding power and data. Finally, it can be important to provide regular measurements from each of such assets, to ensure that any issues that arise within the system can be quickly detected and addressed. This is often not possible in the case in a manually reported system, or system of patchwork, incompatible meter reporting devices. That is because uniform measurement and reporting is generally incompatible with issues of access and aggregation. However, the present methods and systems overcome the challenges of previous systems by providing an efficiently connected and flexibly deployed system for tracking water or other asset/utility management and usage.

Additionally, the systems of the present disclosure can be distributed in areas where data or power connections are not generally available, and do not affect resource flow in a meter (i.e., they do not self-power through parasitic power draw from the resource, whether on a power line or due to installation of a power generating feature along a water line). Furthermore, the systems of the present disclosure have the capability of validation and installation of a system such that each component can have its operational status monitored alongside the resource usage monitoring provided by that component. Additional advantages are apparent as well, and are reflected in the features recited in the following claims.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention. In various embodiments, the types of networks used for communication between the computing devices that make up the present invention include, but are not limited to, an internet, an intranet, wide area networks (WAN), local area networks (LAN), and virtual private networks (VPN).

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

The invention claimed is:

1. A system for monitoring a utility resource, the system comprising:

a plurality of utility resource usage capture components, each utility resource usage capture component positioned at a predetermined location and including a utility resource meter interface and a satellite communication module, the utility resource meter interface configured to communicate with a single corresponding utility resource meter, the utility resource meter being of any of a plurality of different types of utility resource meters from a plurality of different manufacturers, each of the plurality of utility resource usage capture components having a low power state and an operational state and configured to automatically enter the operational state, interrogate one associated utility resource meter to obtain a reading, format the reading into a common data format, and communicate the reading via the satellite communication module to a utility resource management computing system based on a persistent satellite connection preference, and return to the low power state, wherein the persistent satellite connection preference avoids requiring renegotiation of a direct satellite connection between the satellite communication module and a predetermined satellite of a satellite communications network prior to communicating the reading;

a utility resource management computing system communicatively connected to the satellite communications network, the utility resource management computing system storing information regarding a location of each of the plurality of utility resource usage capture components and configured to receive and store readings from each of the plurality of utility resource usage capture components.

2. The system of claim 1, further comprising the satellite communication network, wherein the satellite communication network includes one or more geostationary satellites and is communicatively coupled between each of the plurality of utility resource usage capture components and the utility resource management computing system.

3. The system of claim 1, wherein each of the plurality of utility resource usage capture components is positioned at a different resource usage location of the utility resource distribution network, thereby allowing the utility resource management computing system to track information regarding utility resource usage across the entire system.

4. The system of claim 1, wherein the utility resource comprises water, and wherein the utility resource meter comprises a water meter, and wherein water flow passing by each utility resource meter and associated utility resource usage capture component is unobstructed.

5. The system of claim 1, wherein the utility resource meter interface comprises an interface selected from a group of types of interfaces consisting of:
- a wired serial data interface;
- a radio link interface;
- an optical link interface;
- a contact closure interface; and
- a pulse interface.

6. The system of claim 1, wherein the utility resource management computing system includes a database storing associations between each of the plurality of utility resource usage capture components and both a resource user and a resource provider.

7. The system of claim 1, wherein each of the plurality of utility resource usage capture components lack a connection to an external power source.

8. The system of claim 1, wherein the utility resource is a resource selected from a group of utility resources consisting of:
- a water utility;
- an electrical utility;
- a gas utility;
- an oil well;
- an irrigation management system;
- a water rights management and monitoring system; and
- a gas storage monitoring system.

9. A method of monitoring usage of a utility resource, the method comprising:
- electrically connecting each of a plurality of utility resource usage capture components with one of a plurality of utility resource meters within a utility network, the plurality of utility resource meters including utility resource meters made by a plurality of different manufacturers, each of the plurality of utility resource usage capture components having a low power state and an operational state;
- capturing an identity of each utility resource usage capture component and associating the identity with a location of the utility resource meter, a resource user, and a utility; and
- automatically receiving, via a direct satellite communication link to each of the plurality of utility resource usage capture components via a persistent satellite connection preference associated with each of the plurality of utility resource usage capture components, periodic updates from each of the plurality of utility resource meters at the associated plurality of utility resource usage capture components converted by resource usage capture components to a common data format, wherein the persistent satellite connection preference avoids requiring renegotiation of a satellite connection prior to communicating the reading, wherein one or more of the periodic updates are received from each respective utility resource capture component of the plurality of utility resource capture components upon the respective utility resource capture component entering the operational state from the low power state.

10. The method of claim 9, wherein automatically receiving periodic updates comprises receiving daily updates from each of the plurality of utility resource meters.

11. The method of claim 10, wherein automatically receiving periodic updates occurs at a utility resource management computing system.

12. The method of claim 11, further comprising, upon detecting an anomaly in utility resource usage based on the periodic updates, transmitting a command from the utility resource management computing system to one or more utility resource usage capture components, thereby altering a frequency at which periodic updates are received from those one or more utility resource usage capture components.

13. The method of claim 9, further comprising storing each of the periodic updates in a resource usage database.

14. The method of claim 13, wherein each periodic update includes a meter reading, a timestamp, and an identity of a utility resource usage capture component from which it is received.

15. The method of claim 14, wherein storing each of the periodic updates in a resource usage database includes associating each update with a corresponding resource consumer and resource provider.

16. The method of claim 13, further comprising providing a web interface to the database accessible at least to a resource consumer and a resource provider.

17. A water monitoring system comprising:
- a plurality of water usage capture components positioned at a plurality of different, known locations exposed to environmental conditions, each of the plurality of water usage capture components communicatively connected to a single, different installed water meter across a water district, and wherein one or more of the water usage capture components lacks a connection to an external power source and wherein water flow passing each water meter and associated water usage capture component is unobstructed, the water usage capture components each including:
  - a water meter interface including a wired interface communicatively connected to the single, installed water meter at the known location, the water meter interface configured to communicate with a plurality of different types of water meters from a plurality of different manufacturers;
  - a controller incorporated into the water meter interface and operable in a plurality of different states including a low power state and an operational state, the controller configured to automatically enter the operational state, interrogate the water meter via the water meter interface to obtain a reading, format the reading from a proprietary data format of the water meter into a common data format, and return to the low power state;
  - a satellite communication module configured to receive the formatted reading from the controller and directly communicate the reading to a remote system via a satellite communication network based on a persistent satellite connection preference without requiring renegotiation of a satellite connection prior to communicating the reading, the satellite communication module being preconfigured to communicate the reading at a predetermined time different from communications times of one or more other water usage capture components;
  - a battery power source comprising one or more batteries, the battery power source providing electrical power to the water meter interface, the controller, and the satellite communication module; and
  - an environmentally protective housing encapsulating the water meter interface, the controller, the satellite communication module, and the battery power source;
- a water management computing system communicatively connected to a message relay device of the satellite communications network, the water management computing system including a water management database storing information regarding a location of each of the plurality of water usage capture components and configured to receive and store readings from each of the plurality of water usage capture components in the common data format;

wherein the water management computing system generates a user interface configured to display at least a portion of one or more water meter usage records from the water management database, each water meter usage record including a customer identifier, a meter identifier, a location, and one or more meter readings.

18. The water monitoring system of claim 17, further comprising a satellite communication network communicatively coupled between each of the plurality of water resource usage capture components and the water management computing system, wherein the satellite communication network includes a message relay device.

19. The system of claim 1, wherein the low power state comprises a sleep state.

20. The system of claim 1, wherein each of the plurality of utility resource usage capture components includes a battery power source, the battery power source comprising one or more lithium batteries and having a capacity to provide at least 10 years of life to the associated utility resource usage capture component.

21. The system of claim 17, wherein the water management computing system is configured to identify water loss within the water network based on meter readings from each of the water usage capture components.

22. The system of claim 1, wherein the utility resource management computing system is configured to detect resource loss across a utility resource distribution network monitored by a plurality of utility resource meters associated with the plurality of utility resource usage capture components.

23. The system of claim 1, wherein the utility resource meter interface comprises a wired interface.

* * * * *